(12) United States Patent
Rodriguez et al.

(10) Patent No.: US 8,259,817 B2
(45) Date of Patent: Sep. 4, 2012

(54) FACILITATING FAST CHANNEL CHANGES THROUGH PROMOTION OF PICTURES

(75) Inventors: Arturo A. Rodriguez, Norcross, GA (US); Gregory Shepherd, Eugene, OR (US); Benjamin M. Cook, Flowery Branch, GA (US)

(73) Assignee: Cisco Technology, Inc., San Jose, CA (US)

( * ) Notice: Subject to any disclaimer, the term of this patent is extended or adjusted under 35 U.S.C. 154(b) by 371 days.

(21) Appl. No.: 12/617,015

(22) Filed: Nov. 12, 2009

(65) Prior Publication Data

US 2010/0118978 A1 May 13, 2010

Related U.S. Application Data

(60) Provisional application No. 61/114,060, filed on Nov. 12, 2008.

(51) Int. Cl.
*H04N 11/02* (2006.01)
(52) U.S. Cl. ............ 375/240.26; 375/240.25; 375/240.1
(58) Field of Classification Search ............... 375/240.1, 375/12, 16; 348/420.1
See application file for complete search history.

(56) References Cited

U.S. PATENT DOCUMENTS

| | | | |
|---|---|---|---|
| 5,440,345 A | 8/1995 | Shimoda | |
| 5,606,359 A | 2/1997 | Youden | |
| 5,734,443 A | 3/1998 | O'Grady | |
| 5,734,783 A | 3/1998 | Shimoda | |
| 5,828,370 A | 10/1998 | Moeller et al. | |
| 5,917,830 A | 6/1999 | Chen et al. | |
| 5,917,988 A | 6/1999 | Eto | |
| 5,943,447 A | 8/1999 | Tkhor et al. | |
| 5,949,948 A | 9/1999 | Krause et al. | |
| 5,963,260 A | 10/1999 | Bakhmutsky | |
| 6,160,889 A * | 12/2000 | Yagasaki | 380/210 |
| 6,188,436 B1 | 2/2001 | Williams et al. | |
| 6,201,927 B1 | 3/2001 | Commer | |

(Continued)

FOREIGN PATENT DOCUMENTS

EP 0 812 112 A2 12/1997

(Continued)

OTHER PUBLICATIONS

U.S. Appl. No. 12/417,864, filed Apr. 3, 2009 entitled "System and Method for Authorization of Segment Boundary Notifications", Inventors: Theodore R. Grevers, Arturo A. Rodriguez, and Anthony J. Wasilewski.

(Continued)

*Primary Examiner* — David Czekaj
*Assistant Examiner* — Leron Beck
(74) *Attorney, Agent, or Firm* — Merchant & Gould

(57) ABSTRACT

In one embodiment, a method that includes receiving plural representations of a single video signal, wherein each includes a respective sequence of latticed pictures, wherein each latticed picture in each of the plural representations originates from a corresponding respective picture of the video signal; processing the plural representations; separating the processed plural representations into plural segments, each segment consisting of a respective sequence of processed latticed pictures from one of the processed plural representations; arranging the plural segments in successive segments distributions intervals (SDIs) according to a first temporal order and a second temporal order, the successive SDIs to be provided in a video stream; and promoting one or more of the processed latticed pictures among one or more of the plural segments, the promotion corresponding to an increase in picture importance.

20 Claims, 10 Drawing Sheets

U.S. PATENT DOCUMENTS

| | | |
|---|---|---|
| 6,222,979 B1 | 4/2001 | Willis et al. |
| 6,304,714 B1 | 10/2001 | Krause |
| 6,393,057 B1 | 5/2002 | Thoreau et al. |
| 6,421,387 B1 | 7/2002 | Rhee |
| 6,512,552 B1 | 1/2003 | Subramanian |
| 6,587,506 B1 * | 7/2003 | Noridomi et al. ........ 375/240.12 |
| 6,594,798 B1 | 7/2003 | Chou et al. |
| 6,643,327 B1 * | 11/2003 | Wang ....................... 375/240.12 |
| 6,658,199 B1 | 12/2003 | Hallberg |
| 6,754,373 B1 * | 6/2004 | de Cuetos et al. ............. 382/118 |
| 6,806,909 B1 | 10/2004 | Radha et al. |
| 6,906,743 B1 | 6/2005 | Maurer |
| 6,907,075 B2 | 6/2005 | Felts et al. |
| 6,909,743 B1 | 6/2005 | Ward et al. |
| 6,912,251 B1 | 6/2005 | Ward et al. |
| 6,980,594 B2 | 12/2005 | Wang et al. |
| 7,027,713 B1 | 4/2006 | Hallberg |
| 7,050,603 B2 | 5/2006 | Rhoads |
| 7,053,874 B2 | 5/2006 | Koyama |
| 7,085,322 B2 | 8/2006 | Ngai et al. |
| 7,095,783 B1 | 8/2006 | Sotheran et al. |
| 7,096,482 B2 | 8/2006 | Fujita et al. |
| 7,129,962 B1 | 10/2006 | Cote et al. |
| 7,185,018 B2 | 2/2007 | Archbold |
| 7,236,520 B2 | 6/2007 | Kim et al. |
| 7,243,193 B2 | 7/2007 | Walmsley |
| 7,317,839 B2 | 1/2008 | Holcomb |
| 7,397,858 B2 * | 7/2008 | Garrido et al. ........... 375/240.29 |
| 7,480,335 B2 | 1/2009 | Payson |
| 7,577,198 B2 | 8/2009 | Holcomb |
| 7,584,495 B2 | 9/2009 | Hannuksela et al. |
| 7,590,180 B2 | 9/2009 | Kang |
| 7,599,435 B2 | 10/2009 | Marpe et al. |
| 7,599,438 B2 | 10/2009 | Holcomb |
| 7,606,308 B2 | 10/2009 | Holcomb |
| 7,616,692 B2 | 11/2009 | Holcomb |
| 7,620,106 B2 | 11/2009 | Holcomb |
| 7,623,574 B2 | 11/2009 | Holcomb |
| 7,649,937 B2 | 1/2010 | Rabenold et al. |
| 7,656,410 B2 | 2/2010 | Chiu |
| 7,889,788 B2 | 2/2011 | Toma et al. |
| 7,903,743 B2 | 3/2011 | Ho |
| 7,912,219 B1 | 3/2011 | Michener et al. |
| 2002/0075402 A1 | 6/2002 | Robson et al. |
| 2002/0149591 A1 | 10/2002 | Van Der Vleuten et al. |
| 2002/0162111 A1 | 10/2002 | Shimizu et al. |
| 2002/0176025 A1 | 11/2002 | Kim |
| 2002/0178444 A1 | 11/2002 | Trajkovic et al. |
| 2003/0012554 A1 | 1/2003 | Zeidler et al. |
| 2003/0043847 A1 | 3/2003 | Haddad |
| 2003/0072555 A1 | 4/2003 | Yap et al. |
| 2003/0081934 A1 | 5/2003 | Kirmuss |
| 2003/0093418 A1 | 5/2003 | Archbold |
| 2003/0093800 A1 | 5/2003 | Demas et al. |
| 2003/0113098 A1 | 6/2003 | Willis |
| 2003/0123849 A1 | 7/2003 | Nallur |
| 2003/0161407 A1 | 8/2003 | Murdock et al. |
| 2003/0189982 A1 | 10/2003 | MacInnis |
| 2004/0078186 A1 | 4/2004 | Nair |
| 2004/0128578 A1 | 7/2004 | Jonnalagadda |
| 2004/0133908 A1 | 7/2004 | Smith et al. |
| 2004/0177369 A1 | 9/2004 | Akins |
| 2004/0179619 A1 | 9/2004 | Tian et al. |
| 2004/0210925 A1 | 10/2004 | Miyazawa et al. |
| 2004/0218816 A1 | 11/2004 | Hannuksela |
| 2005/0002574 A1 | 1/2005 | Fukuhara et al. |
| 2005/0013249 A1 | 1/2005 | Kong et al. |
| 2005/0022245 A1 | 1/2005 | Nallur et al. |
| 2005/0053134 A1 | 3/2005 | Holcomb |
| 2005/0053140 A1 | 3/2005 | Holcomb |
| 2005/0053141 A1 | 3/2005 | Holcomb |
| 2005/0053142 A1 | 3/2005 | Holcomb |
| 2005/0053143 A1 | 3/2005 | Holcomb |
| 2005/0053144 A1 | 3/2005 | Holcomb |
| 2005/0053155 A1 | 3/2005 | Holcomb |
| 2005/0053295 A1 | 3/2005 | Holcomb |
| 2005/0069212 A1 | 3/2005 | Bottreau et al. |
| 2005/0123056 A1 | 6/2005 | Wang |
| 2005/0175098 A1 | 8/2005 | Narasimhan et al. |
| 2005/0190774 A1 | 9/2005 | Wiegand |
| 2005/0207733 A1 | 9/2005 | Gargi |
| 2005/0229225 A1 | 10/2005 | Klausberger et al. |
| 2006/0013305 A1 | 1/2006 | Sun |
| 2006/0072597 A1 | 4/2006 | Hannuksela |
| 2006/0083298 A1 | 4/2006 | Wang |
| 2006/0083311 A1 | 4/2006 | Winger |
| 2006/0093045 A1 | 5/2006 | Anderson et al. |
| 2006/0093315 A1 | 5/2006 | Kelly et al. |
| 2006/0126728 A1 | 6/2006 | Yu et al. |
| 2006/0129914 A1 | 6/2006 | Ellis |
| 2006/0132822 A1 | 6/2006 | Walmsley |
| 2006/0147121 A1 | 7/2006 | Maeda et al. |
| 2006/0222319 A1 | 10/2006 | Russ |
| 2006/0224763 A1 | 10/2006 | Altunbasak et al. |
| 2006/0294171 A1 | 12/2006 | Bossen |
| 2007/0019724 A1 | 1/2007 | Tourapis |
| 2007/0030186 A1 | 2/2007 | Archbold |
| 2007/0030356 A1 | 2/2007 | Yea |
| 2007/0030818 A1 | 2/2007 | Bahnck et al. |
| 2007/0031110 A1 | 2/2007 | Rijckaert |
| 2007/0091997 A1 | 4/2007 | Fogg et al. |
| 2007/0109409 A1 | 5/2007 | Yea |
| 2007/0112721 A1 | 5/2007 | Archbold |
| 2007/0116426 A1 | 5/2007 | Toma et al. |
| 2007/0121721 A1 | 5/2007 | Kim et al. |
| 2007/0133674 A1 | 6/2007 | Garnier et al. |
| 2007/0140358 A1 | 6/2007 | Schwartz et al. |
| 2007/0153679 A1 | 7/2007 | Jost et al. |
| 2007/0172133 A1 | 7/2007 | Kim |
| 2007/0183494 A1 | 8/2007 | Hannuksela |
| 2007/0194975 A1 | 8/2007 | Jang et al. |
| 2007/0223595 A1 | 9/2007 | Hannuksela et al. |
| 2007/0230496 A1 | 10/2007 | Guo et al. |
| 2007/0245382 A1 | 10/2007 | Doi et al. |
| 2007/0280350 A1 | 12/2007 | Mathew et al. |
| 2008/0025399 A1 | 1/2008 | Le Leannec et al. |
| 2008/0055463 A1 * | 3/2008 | Lerner et al. ................ 348/420.1 |
| 2008/0056383 A1 | 3/2008 | Ueki et al. |
| 2008/0063074 A1 | 3/2008 | Gallant et al. |
| 2008/0115175 A1 | 5/2008 | Rodriguez |
| 2008/0115176 A1 | 5/2008 | Rodriguez |
| 2008/0117985 A1 | 5/2008 | Chen |
| 2008/0127255 A1 | 5/2008 | Ress et al. |
| 2008/0131079 A1 | 6/2008 | Toma |
| 2008/0137742 A1 | 6/2008 | Chen |
| 2008/0141091 A1 | 6/2008 | Kalluri |
| 2008/0152005 A1 | 6/2008 | Oguz et al. |
| 2008/0163308 A1 | 7/2008 | Kim |
| 2008/0192817 A1 | 8/2008 | Llach et al. |
| 2008/0225850 A1 | 9/2008 | Oran et al. |
| 2008/0225951 A1 | 9/2008 | Young |
| 2008/0247463 A1 | 10/2008 | Buttimer |
| 2008/0256409 A1 | 10/2008 | Oran et al. |
| 2008/0260045 A1 | 10/2008 | Rodriguez et al. |
| 2008/0311869 A1 | 12/2008 | Koga et al. |
| 2008/0320558 A1 | 12/2008 | Imanishi et al. |
| 2009/0002379 A1 | 1/2009 | Baeza |
| 2009/0003446 A1 | 1/2009 | Wu |
| 2009/0003447 A1 | 1/2009 | Christoffersen |
| 2009/0028247 A1 | 1/2009 | Shuh |
| 2009/0034627 A1 | 2/2009 | Rodriguez et al. |
| 2009/0034633 A1 | 2/2009 | Rodirguez et al. |
| 2009/0073928 A1 | 3/2009 | Power |
| 2009/0100482 A1 | 4/2009 | Rodriguez et al. |
| 2009/0103635 A1 | 4/2009 | Pahalawatta |
| 2009/0109342 A1 | 4/2009 | Heng et al. |
| 2009/0116558 A1 | 5/2009 | Chen |
| 2009/0138668 A1 | 5/2009 | Blankenship |
| 2009/0141168 A1 | 6/2009 | Chen et al. |
| 2009/0148056 A1 | 6/2009 | Rodriguez et al. |
| 2009/0148132 A1 | 6/2009 | Rodriguez et al. |
| 2009/0154560 A1 | 6/2009 | Hong |
| 2009/0154563 A1 | 6/2009 | Hong |
| 2009/0161770 A1 | 6/2009 | Dong |
| 2009/0180546 A1 | 7/2009 | Rodriguez et al. |
| 2009/0180547 A1 | 7/2009 | Rodriguez et al. |
| 2009/0190655 A1 | 7/2009 | Shimada |

| | | | |
|---|---|---|---|
| 2009/0190849 A1 | 7/2009 | Huang |
| 2009/0199231 A1 | 8/2009 | Tsuria et al. |
| 2009/0207904 A1 | 8/2009 | Pandit et al. |
| 2009/0210412 A1 | 8/2009 | Oliver |
| 2009/0214178 A1 | 8/2009 | Takahashi |
| 2009/0220012 A1 | 9/2009 | Rodriguez et al. |
| 2009/0226105 A1 | 9/2009 | Huang |
| 2009/0262804 A1 | 10/2009 | Pandit |
| 2009/0279608 A1 | 11/2009 | Jeon |
| 2009/0296811 A1 | 12/2009 | Jeon |
| 2009/0310934 A1 | 12/2009 | Rodriguez et al. |
| 2009/0313662 A1 | 12/2009 | Rodriguez |
| 2009/0313668 A1 | 12/2009 | Shepherd |
| 2009/0323822 A1 | 12/2009 | Rodriguez et al. |
| 2010/0003015 A1 | 1/2010 | Rodriguez |
| 2010/0020870 A1 | 1/2010 | Jeon |
| 2010/0026882 A1 | 2/2010 | Jeon |
| 2010/0026883 A1 | 2/2010 | Jeon |
| 2010/0026884 A1 | 2/2010 | Jeon |
| 2010/0027417 A1 | 2/2010 | Franceschini et al. |
| 2010/0027653 A1 | 2/2010 | Jeon |
| 2010/0027654 A1 | 2/2010 | Jeon |
| 2010/0027659 A1 | 2/2010 | Jeon |
| 2010/0027660 A1 | 2/2010 | Jeon |
| 2010/0027667 A1* | 2/2010 | Samuelsson et al. ..... 375/240.16 |
| 2010/0027682 A1 | 2/2010 | Jeon |
| 2010/0118973 A1 | 5/2010 | Rodriguez et al. |
| 2010/0118974 A1 | 5/2010 | Rodriguez et al. |
| 2010/0118979 A1 | 5/2010 | Rodriguez et al. |
| 2010/0122311 A1 | 5/2010 | Rodriguez et al. |
| 2010/0215338 A1 | 8/2010 | Rodriguez |
| 2010/0218232 A1 | 8/2010 | Rodriguez |
| 2010/0241753 A1 | 9/2010 | Garbajs et al. |
| 2010/0293571 A1 | 11/2010 | Rodriguez |
| 2010/0322302 A1 | 12/2010 | Rodriguez |
| 2011/0222837 A1 | 9/2011 | Walton et al. |

FOREIGN PATENT DOCUMENTS

| | | |
|---|---|---|
| EP | 1 292 138 A2 | 3/2003 |
| EP | 1 328 119 A1 | 7/2003 |
| JP | 05-236465 | 9/1993 |
| KR | 10-2004-0054708 | 6/2004 |
| WO | WO 00/00981 A2 | 1/2000 |
| WO | WO 00/62552 A2 | 10/2000 |
| WO | WO 01/43440 A | 6/2001 |
| WO | WO 01/63774 A | 8/2001 |
| WO | WO 2004/102571 A1 | 11/2004 |
| WO | WO 2005/106875 A1 | 11/2005 |
| WO | WO 2006/083824 A2 | 8/2006 |
| WO | WO 2006/101979 A | 9/2006 |
| WO | WO 2006/114761 A1 | 11/2006 |
| WO | WO 2008/063881 A2 | 5/2008 |
| WO | WO 2009/018360 A1 | 2/2009 |
| WO | WO 2009/052262 A2 | 4/2009 |

OTHER PUBLICATIONS

U.S. Appl. No. 12/417,868, filed Apr. 3, 2009 entitled "Segment Boundary Notification to a Digital Media Receiver", Inventors: Theodore R. Grevers, Arturo A. Rodriguez, and Anthony J. Wasilewski.

U.S. Appl. No. 12/417,869, filed Apr. 3, 2009 entitled "System and Method for Processing Segment Boundary Notifications", Inventors: Theodore R. Grevers, Arturo A. Rodriguez, and Anthony J. Wasilewski.

U.S. Appl. No. 12/722,117, filed Mar. 11, 2010 entitled "Management of Picture Referencing in Video Streams for Plural Playback Modes", Inventors: Walton et al.

Amon et al., "File Format for Scalable Video Coding", IEEE Transactions on Circuits and Systems for Video Technology, vol. 17 No. 9, Sep. 2007, pp. 1174-1185.

Gruneberg et al., International Organisation for Standardisation Organisation Internationale de Normalisation ISO/IEC JTC1/SC29/WG11 Coding of Moving Pictures and Audio, "Proposal for MPEG-2 Transport Stream Extensions for Scalable Video Coding", XP030043296, Jul. 2007, 6 pages.

Hurst et al., "MPEG Splicing Tutorial and Proposed SMPTE Standard", Proceedings of the SMPTE Technical Conference, Nov. 1997, pp. 105-117.

ITU: "Series H: Audiovisual and Multimedia Systems: Infrastructure of Audiovisual Services—Transmission Multiplexing and Synchronization", Systems ITU-T Recommendation H.222.0, May 2006, http://mirror.itu.int/dms/pay/itu-t/rec/h/T-REC-H.222.0-200605-I PDF E.pdf, XP007905991, pp. 1-76.

ITU-T Telecommunication Standardization Sector of ITU, Infrastrcture of Audiovisual Services—Coding of Moving Video, "Advanced Video Coding for Generic Audiovisual Services", International Telecommunication Union, H.264, May 2003, XP008095420, 282 pages.

Luo et al., "On HRD conformance for splice bitstreams", JVT Meeting, Document JVT-V055r1, Filename JVT-V055r1.doc, XP-30006863, Jan. 2007, pp. 1-11.

MacInnis et al., International Organisation for Standardization Organisation Internationale Normalisation ISO/IEC JTC1/SC29/WG11 Coding of Moving Pictures and Audio, "NAL for AVC Video with MPEG-2 Systems", Video Standards and Drafts, Mar. 2002, pp. 1-11.

Rodriguez et al., "SEI message to convey suitable splice points in the bitstream", JVT Meeting, Document JVT-Z040, Filename JVT-Z040.doc, XP-30007329, Jan. 2008, pp. 1-8.

"Splice Points for MPEG-2 Transport Streams", SMPTE Journal, SMPTE Inc., vol. 107 no. Oct. 1998, XP-000793004, pp. 916-925.

Tian et al., "Sub-Sequence Video Coding for Improved Temporal Scalability", presented at the *IEEE International Symposium on Circuits and Systems—ISCAS*, pp. 6074-6077, 2005.

International Search Report dated Sep. 4, 2009 cited in International Application No. PCT/US2009/047237.

Written Opinion dated Sep. 4, 2009 cited in International Application No. PCT/US2009/047237.

International Search Report dated Sep. 4, 2009 cited in International Application No. PCT/US2009/044370.

Written Opinion dated Sep. 4, 2009 cited in International Application No. PCT/US2009/044370.

International Search Report dated May 23, 2008 cited in International Application No. PCT/US2007/083867.

Written Opinion dated May 23, 2008 cited in International Application No. PCT/US2007/083867.

International Search Report and Written Opinion dated Oct. 30, 1998 cited in International Application No. PCT/US2008/071621.

International Search Report and Written Opinion dated Oct. 18, 2004 cited in International Application No. PCT/US2004/023279.

International Search Report and Written Opinion dated Apr. 15, 2009 cited in International Application No. PCT/US2008/080128.

International Preliminary Report on Patentability and Written Opinion dated Feb. 2, 2010 cited in International Application No. PCT/US2008/071111.

International Search Report and Written Opinion dated Apr. 15, 2010 cited in International Application No. PCT/US2010/024927.

Canadian Office Action dated Dec. 11, 2009 in Application No. 2,533,169.

European Examination dated May 4, 2010 in Application No. 07 844 937.8.

European Examination dated Sep. 16, 2010 in Application No. 08 796 875.6.

U.S. Non-final Office Action in U.S. Appl. No. 10/623,683 dated Dec. 28, 2007.

U.S. Final Office Action in U.S. Appl. No. 10/623,683 dated Jul. 25, 2008.

U.S. Non-Final Office Action in U.S. Appl. No. 11/627,452 dated Nov. 10, 2010.

U.S. Non-Final Office Action in U.S. Appl. No. 11/831,916 dated Feb. 1, 2010.

U.S. Non-Final Office Action in U.S. Appl. No. 11/831,916 dated Aug. 4, 2010.

PCT Search Report cited in International Appln No. PCT/US2009/047521 mailed Dec. 22, 2009.

PCT Written Opinion cited in International Appln No. PCT/US2009/047521 mailed Dec. 22, 2009.

PCT Search Report cited in International Appln No. PCT/US2009/064180 mailed Jan. 8, 2010.
PCT Written Opinion cited in International Appln No. PCT/US2009/064180 mailed Jan. 8, 2010.
U.S. Final Office Action in U.S. Appl. No. 11/627,452 dated Mar. 4, 2011.
U.S. Non-Final Office Action in U.S. Appl. No. 11/831,916 dated Mar. 31, 2011.
U.S. Non-Final Office Action in U.S. Appl. No. 12/417,869 dated Apr. 4, 2011.
U.S. Appl. No. 12/819,157, filed Jun. 18, 2010, entitled "Dynamic Streaming with Latticed Representations of Video", Rodriguez et al.
U.S. Appl. No. 12/616,974, filed Nov. 12, 2009, entitled "Error Concealment of Plural Processed Representations of a Single Video Signal Received in a Video Program", Rodriguez et al.
U.S. Appl. No. 12/616,991, filed Nov. 12, 2009, entitled "Processing Latticed and Non-Latticed Pictures of a Video Program", Rodriguez et al.
U.S. Appl. No. 12/617,043, filed Nov. 12, 2009, entitled "Targeted Bit Appropriations Based on Picture Importance", Rodriguez et al.
U.S. Appl. No. 12/617,062, filed Nov. 12, 2009, entitled "Processing of a Video Program Having Plural Processed Representations of a Single Video Signal for Reconstruction and Output", Rodriguez et al.
U.S. Appl. No. 12/141,015, filed Jun. 17, 2008, entitled "Time-Shifted Transport of Multi-Latticed Video for Resiliency from Burst-Error Effects", Shepherd et al.
U.S. Appl. No. 12/141,017, filed Jun. 17, 2008, entitled "Methods and Systems for Processing Multi-Latticed Video Streams", Rodriguez et al.
U.S. Appl. No. 12/141,019, filed Jun. 17, 2008, entitled "Processing of Impaired and Incomplete Multi-Latticed Video Streams", Rodriguez et al.
Stuhlmuller, Klaus, et al., "Analysis of Video Transmission over Lossy Channels"; IEEE Journal on Selected Areas in Communication, vol. 18, No. 6, Jun. 2000, pp. 1012-1032.
European Communication dated Aug. 9, 2011 in Application No. 08 838 787.3.
European Communication dated Dec. 14, 2011 in Application No. 09 751 294.1.
U.S. Non-Final Office Action in U.S. Appl. No. 12/417,864 dated Apr. 18, 2011.
U.S. Final Office Action mailed Jul. 5, 2011 in U.S. Appl. No. 12/417,864.
U.S. Non-Final Office Action mailed Aug. 5, 2011 in U.S. Appl. No. 11/831,906.
U.S. Final Office Action mailed Aug. 5, 2011 in U.S. Appl. No. 12/417,869.
U.S. Non-Final Office Action mailed Sep. 14, 2011 in U.S. Appl. No. 12/124,779.
U.S. Non-Final Office Action mailed Sep. 22, 2011 in U.S. Appl. No. 11/831,912.
U.S. Final Office Action mailed Sep. 28, 2011 in U.S. Appl. No. 11/831,916.
U.S. Non-Final Office Action mailed Nov. 10, 2011 in U.S. Appl. No. 12/483,925.
U.S. Non-Final Office Action mailed Nov. 23, 2011 in U.S. Appl. No. 12/141,015.
U.S. Non-Final Office Action mailed Nov. 29, 2011 in U.S. Appl. No. 12/492,117.
U.S. Non-Final Office Action mailed Nov. 23, 2011 in U.S. Appl. No. 12/141,017.
U.S. Non-Final Office Action mailed Dec. 21, 2011 in U.S. Appl. No. 12/333,296.
U.S. Non-Final Office Action mailed Dec. 22, 2011 in U.S. Appl. No. 12/617,043.
U.S. Non-Final Office Action mailed Dec. 27, 2011 in U.S. Appl. No. 12/417,869.
U.S. Non-Final Office Action mailed Dec. 27, 2011 in U.S. Appl. No. 12/252,632.
U.S. Non-Final Office Action mailed Jan. 4, 2012 in U.S. Appl. No. 12/617,062.
U.S. Non-Final Office Action mailed Jan. 10, 2012 in U.S. Appl. No. 12/333,301.
U.S. Final Office Action mailed Jan. 19, 2012 in U.S. Appl. No. 12/124,779.
U.S. Final Office Action mailed Feb. 17, 2012 in U.S. Appl. No. 11/627,452.

* cited by examiner

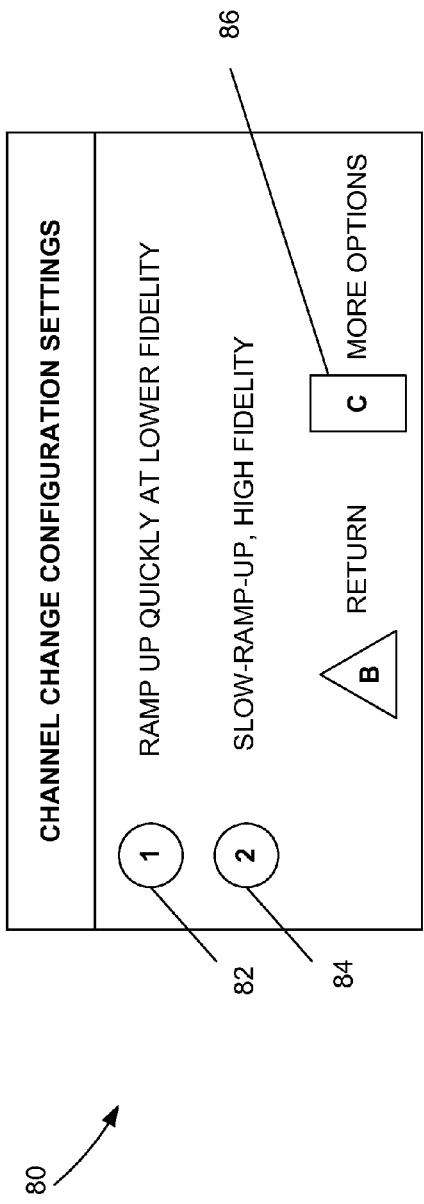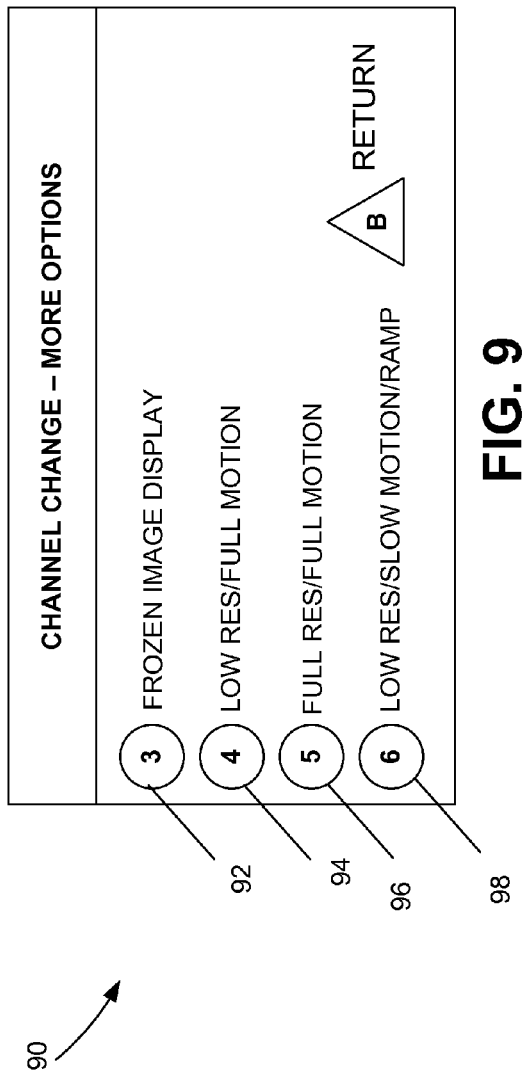

FACILITATING FAST CHANNEL CHANGES THROUGH PROMOTION OF PICTURES

CROSS-REFERENCE TO RELATED APPLICATION

This application claims priority to U.S. provisional application having Ser. No. 61/114,060, filed on Nov. 12, 2008, and incorporated herein by reference in its entirety.

TECHNICAL FIELD

The present disclosure relates generally to transmitting, receiving, and/or processing video content.

BACKGROUND

Transfer of a video stream over digital networks includes several aspects, such as video compression, error correction, and data loss concealment for various types of communications networks and systems. Such applications often require robust systems and methods that facilitate data transport with minimal data loss or perceived data loss. Systems for minimizing data loss or perceived data loss are particularly important in applications such as video-broadcast applications using packet-switched networks, such as the Internet, where large burst errors are common. Unfortunately, conventional systems and methods for facilitating robust data transfer with minimal data loss or perceived data loss often cannot accommodate relatively large data losses without requiring excessive network bandwidth and memory. In parallel, advances and trends in video compression methods are providing better performance (lower bit-rates) but not without introducing side effects. While all these advances provide certain benefits, they also present challenges since higher importance information provided in the video stream is often more prone to error. The inherent information dependencies produced by these trends in video coding do not extend the level of granularity needed for quick recovery from impairments or the ability to associate errors with a small portion of visual information. Furthermore, these trends and advancements are often causing longer random access or channel change times, even in the absence of impairments in the transfer of video streams.

BRIEF DESCRIPTION OF THE DRAWINGS

FIGS. 8-9 are screen diagrams that illustrate subscriber interfaces for controlling the fidelity of pictures in a fast channel change environment.

DESCRIPTION OF EXAMPLE EMBODIMENTS

Overview

Figure 1:
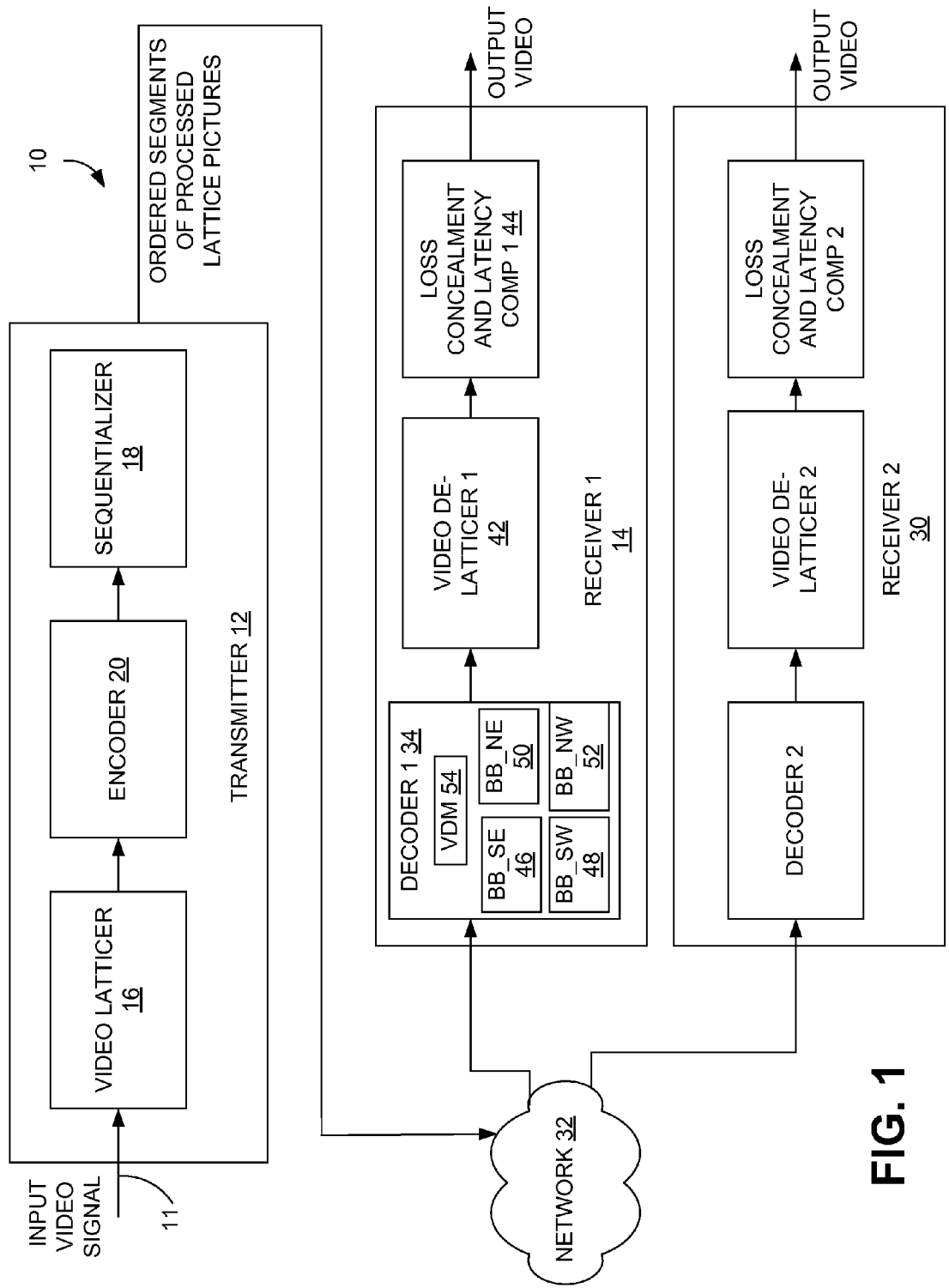
FIG. 1 is a diagram of an example environment where video latticing systems and methods are employed.

In one embodiment, a method that includes receiving plural representations of a single video signal, wherein each of the plural representations includes a respective sequence of latticed pictures, wherein each latticed picture in each of the plural representations originates from a corresponding respective picture of the video signal, wherein the order of successive pictures in each of the plural representations of the video signal corresponds to the order of successive pictures in the video signal; processing the plural representations; separating the processed plural representations into plural segments, each segment consisting of a respective sequence of processed latticed pictures from one of the processed plural representations; arranging the plural segments in successive segments distributions intervals (SDIs) according to a first temporal order and a second temporal order, the successive SDIs to be provided in a video stream; and promoting one or more of the processed latticed pictures among one or more of the plural segments, the promotion corresponding to an increase in picture importance.

Example Embodiments

Certain embodiments of video latticing (VL) systems and methods are disclosed (collectively referred to herein also as VL systems) that employ inventive techniques that organize the order to one or more segments (e.g., groups of pictures or GOPs, or plural processed pictures in successive intervals of a video stream) of corresponding latticed pictures of video representations corresponding to a video signal. Techniques may also appropriate bit allocations of one or more segments of processed latticed pictures based at least in part on picture importance and/or picture type. In addition, certain embodiments of the disclosed VL systems order, or organize the arrangement of segments of processed latticed pictures provided in a video stream at the segment level, resulting in a time-shifted sequence of non-overlapping segments containing corresponding visual data from plural latticed representations of the input video signal. Further, certain embodiments of the disclosed VL systems provide various solutions to address decoding latency for rapid random access or fast channel change time, as explained in further detail below.

As a brief overview, a sequence of uncompressed, digitized pictures corresponding to at least a portion of a program (e.g., a television program) is an input video signal to a transmitter or other apparatus or system comprising latticing, encoding, and ordering functionality of segments, each of the segments containing of one or more processed latticed pictures. The pictures of a program may be sourced from a program provider, camera, among other sources well-known to those having ordinary skill in the art. Each picture is latticed or subsampled at the transmitter according to a given lattice scheme. One example lattice scheme is illustrated by FIG. 2. Shown is a picture 60 of input video signal 11 (in FIG. 1) that is subsampled or logically partitioned by mapping non-overlapping contiguous 2×2 sampling matrices (one example matrix shown in bold in FIG. 2) on the picture 60, where each pixel from each 2×2 sampling matrix (or herein, matrix) is assigned to a respective partition, i.e., lattice. For example a first group of pixels in the top-left matrix includes pixels 00, 01, 10, and 11. All northwest (NW) pixels (e.g., pixel 00) comprise a first lattice, V0, and are assigned to a first latticed picture, LP0. All northeast (NE) pixels (e.g., pixel 01) comprise a second lattice, V1, and are assigned to a second latticed picture, LP1. All southwest (SW) pixels (e.g., pixel 10) comprise a third lattice, V2, and are assigned to a third latticed picture, LP2. All southeast (SE) pixels (e.g., pixel 11) comprise a fourth lattice, V3, and are assigned to a fourth latticed picture, LP3. Note that the different lattices V0-V3 may be referred to also herein as SE, SW, NE, NW latticed pictures and correspond to respective latticed video representations, SE, SW, NE, NW, which can be individually segmented into segments of groups of pictures (GOPs) for processing or in alternate embodiments, separately processed and segmented into GOPs.

Hence, the lattice V0 is assigned every other pixel on every other row and every other column starting with pixel 00, i.e., V0 is assigned pixels mn, where m and n correspond to the row number and column number, respectively, and are even integers. For V1, m is an even integer and n is an odd integer. For V2, m is an odd integer and n is an even integer. Similarly, for V3, m and n are odd integers. When referring to sequence of pictures of the input video signal, lattices V0-V3 can be applied to the successive pictures to obtain four latticed video representations that can be processed separately and independently from each other.

One implementation involves processing different segments containing one or more of the latticed pictures of one or more representations of the video signal, herein referred to as latticed video representations (LVRs), at transmitter 12 in time-shifted intervals for the purpose of orchestrating the order of how segments of processed latticed pictures are included in a single video stream. Segments are provided in successive segments-distribution intervals (SDIs) of the video stream according to a determined order. Each successive SDI contains plural non-overlapping segments. Each latticed picture is obtained by selecting a corresponding pixel from each sampling matrix superimposed on the successive pictures of the input video signal or in an alternate embodiment, by obtaining a representative pixel value by processing or filtering information of the picture based on the location of the corresponding pixel in the sampling matrix. Each separate sequence of latticed pictures of the input video signal is a respective independent representation of the video signal or LVR. The order and organization arrangement of segments in the video stream may be chosen based on the size of the respective segments (e.g., number of bits for plural compressed latticed pictures in a segment) or the number of processed latticed pictures in each segment (i.e., the length of each segment), which in turn may be based on the error characteristics of a transmission channel or network, such as the types and durations of burst errors to which the transmission medium is prone. Alternatively, or additionally, the length of segments may be based on the desire to reduce the amount of time for a random access operation or a channel change operation, or when targeting to reduce the amount of time in these operations when experiencing an impairment or error.

The choice of lattice shape, size, and placement location within a given picture, the number of LVRs and their relationships, the length or number of processed latticed pictures in a segment, and/or the ordering and arrangement of segments in SDIs effects the manner in which losses are revealed in a given picture (e.g., horizontal bands, vertical bands, diagonal band, etc.). There are a variety of different loss patterns, the discussion of which is unnecessary for an understanding of the disclosed embodiments and hence omitted herein for brevity.

Continuing, one mechanism maps a picture or frame (picture and frame used interchangeably throughout the disclosure) of a video signal with a plurality of matrices or lattices (matrices and lattices used interchangeably throughout the disclosure). For the purposes of the present discussion, a matrix may be any grouping of pixels or data associated therewith. A pixel may include one or more values associated with a data point, where a data point may be a smallest displayable element or portion of a video picture. A video picture may be any collection of data used to facilitate constructing an image or representation thereof.

For instance, the transmitter separates or subsamples a video signal into plural identifiable LVRs. Such lattices or LVRs are not to be confused with the layers of a scalable video coding method, nor are such LVRs to be confused with three-dimensional (3D) video since representations (LVRs) in the present disclosure are borne from one input video source, such as provided by a single camera or single camera angle. Each LVR in a set of plural LVRs can be processed independently from each other. Each of these latticesis associated with, or "assigned," pixel data from a corresponding set of pixel locations, also referred to as a "sampling region," in each picture of the video signal. Each LVR represents pixel information from a respective latticed version of the input video signal, and a respective latticed picture is included within a corresponding LVR. Each set of sampled pixel locations providing a distinct latticed picture is said to form a lattice of pixels. The respective latticed pictures originating from the successive pictures of the input video signal constitute the corresponding LVRs of the input video signal. Each LVR may be processed into a respective sequence of processed latticed pictures, such as a sequence of compressed latticed pictures, herein also referred to as a processed LVR (PLVR). Prior to processing and/or compression, each LVR may be segmented into sequential non-overlapping segments of latticed pictures. Alternatively, each LVR may be processed and thereafter each PLVR may be segmented into segments of processed latticed pictures. In respective embodiments, segmentation may be effected prior to, while, or after processing an LVR. The arrangement and ordering of segments from multiple LVRs or PLVRs into successive non-overlapping SDIs in the video stream is performed prior to transmission.

In one embodiment, each respective processed (e.g., compressed) LVR is segmented into non-overlapping contiguous segments of compressed latticed pictures (e.g., processed latticed pictures). Each segment includes consecutive compressed latticed pictures in a transmission order according to a video coding specification (e.g., the MPEG-2 video coding specification). Accordingly, the consecutive compressed latticed pictures in the segment are provided in non-overlapping manner in sequential transmission order. Consecutive segments of a PLVR exhibit the same transmission order continuity as if the PLVR had not been segmented.

Each separate sequence of latticed pictures of the input video signal is a respective independent representation of the video signal. In some embodiments, the pictures of each respective LVR may be processed or compressed independently from other LVRs of the input video signal. Each PLVR (e.g., each LVR in compressed form) may be provided in a single video stream but some, and possibly all, of its consecutive segments can be separated by one or more segments of other PLVRs in the video stream. In one embodiment, all consecutive segments of a first PLVR are provided in a single video stream in their sequential order but separated by at least one segment of a different PLVR. In another embodiment, the successive segments of the first PLVR in the video stream are separated by a plurality of segments, each respectively corresponding to a different PLVR. In yet another embodiment, for a complete set of LVRs (as explained further below), the successive segments of each PLVR are provided in the video stream separated by a plurality of segments, each provided separating segment respectively corresponding to one of the other PLVRs of the complete set of LVRs.

Figure 2:
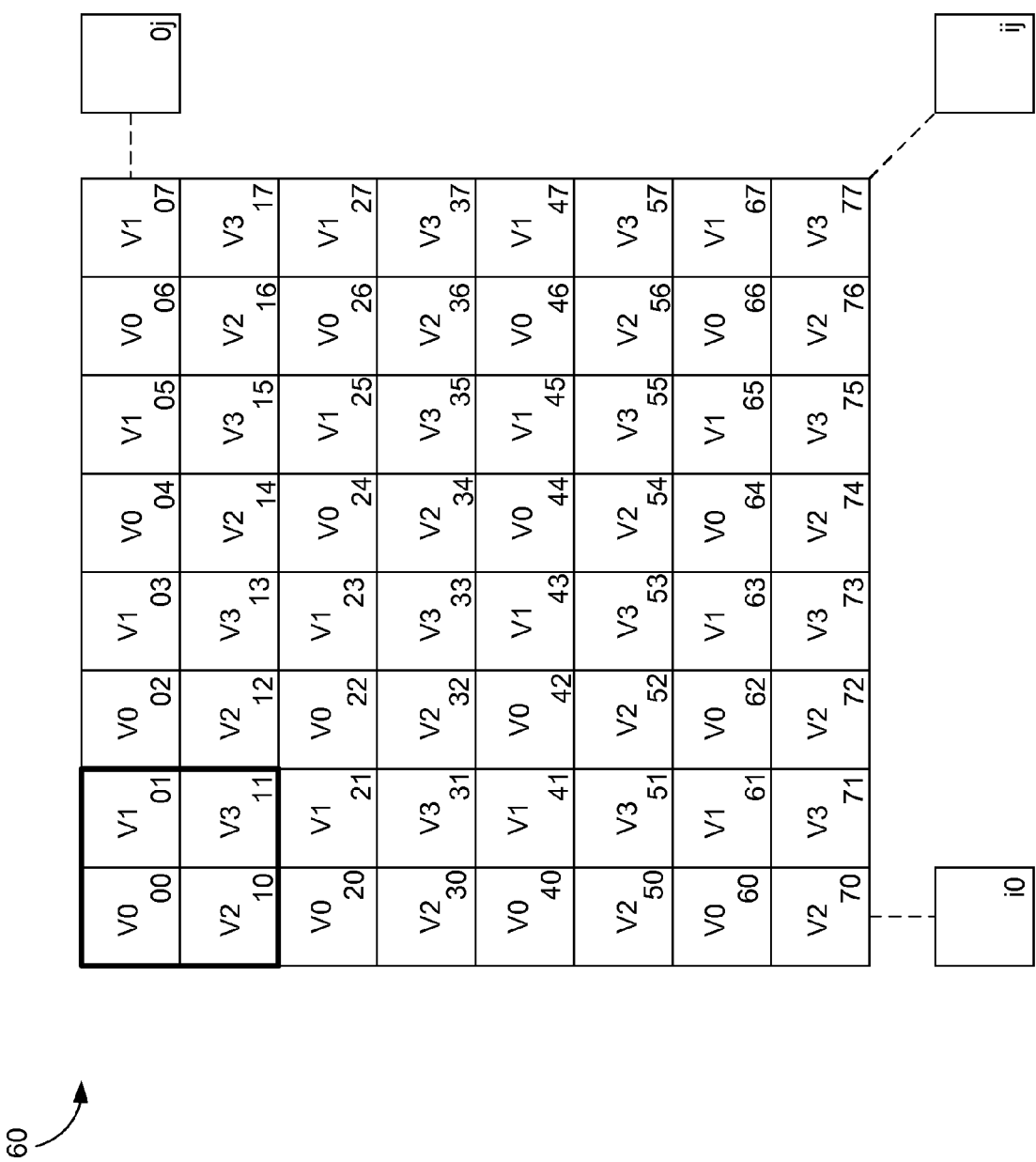
FIG. 2 is a diagram illustrating a first example latticing of a picture by the system of FIG. 1.

Segments of one or more PLVRs may be received in a video stream by a receiver (e.g., receiver 14 in FIG. 1). In one embodiment, all segments of a first PLVR are received separated by one or more segments of other PLVRs in the video stream. That is, consecutive segments of the first PLVR are received with at least one or more segments of other PLVRs between them. In yet another embodiment, for a complete set of LVRs (as defined below), the successive segments of each PLVR are received in the video stream separated by a plurality of segments, each received separating segment respectively corresponding to one of the other PLVRs of the complete set of LVRs. Successive segments of respective PLVRs may be separated and extracted at the receiver 14 and coalesced into the respective PLVR to independently decode its compressed latticed pictures into decompressed form, which can then be output as a sequence of pictures in their output order In some embodiments one or more (and in one embodiment, all) of the pictures of the input video signal that are designated as non-reference pictures in compressed form are not latticed into plural LVRs, whereas pictures of the input video signal designated as reference pictures are latticed into plural LVRs. In such embodiments, each successive SDI in the video stream has a plurality of segments, or (p+nrs) segments, where p is greater than one and equals the segments containing compressed latticed pictures, and nrs is greater than or equal to one and equals the segments containing compressed non-reference pictures in the full picture resolution of the input video signal. Pictures in one or more of the segments (i.e., the p segments) in the successive non-overlapping SDIs of the video stream contain processed latticed pictures that are of smaller picture resolution than the resolution of the pictures of the input video signal, whereas the other one or more segments (i.e., the nrs segments) contain processed pictures that are non-reference pictures and have a picture resolution equal to the resolution of the pictures of the input video signal. Thus, there is a dependence on the compressed non-reference pictures in at least one of the nrs segments in an SDI on one or more compressed reference pictures, each of which is intended to have full picture resolution by the composition of the respective decompressed version of a complete set of p corresponding latticed pictures (as explained further below) in compressed form, and for which each of the p compressed latticed pictures is included in the same SDI as the respective p segments of compressed latticed pictures.

Each matrix may have a small number of pixels, n, such as, for example, where n=4, there are 4 pixels in a matrix. Note that in a specific embodiment n=p, where p represents the number of resulting LVRs. Hence, a corresponding p number of LVRs are formed, processed, and their segments ordered in successive non-overlapping SDIs of a video stream that is transmitted over a network or channel, as discussed more fully below.

Each segment of a PLVR can include one or more consecutive processed latticed pictures. A compressed latticed picture may be any picture to which a compression algorithm or other operation has been applied to reduce the number of bits used to represent the latticed picture. Each of the consecutive processed latticed pictures in a given PLVR corresponds to a respective latticed picture that originated or was derived from a picture of the input video signal.

A latticed picture (e.g., a subsampled picture) respectively corresponds to the picture that it originated from in the input video signal. The input video signal has a horizontal picture resolution and vertical picture resolution, ip_H and ip_V, respectively, and a total number of pixels, ip_NP, which is equal to ip_H multiplied by ip_V. Every picture in an LVR has a horizontal picture resolution and a vertical picture resolution, lp_H and lp_V, respectively, such that lp_H<ip_H and lp_V<ip_V. The number of pixels in the LVR, lp_NP, equals lp_H multiplied by lp_V.

If two or more latticed pictures originate from the same picture of the input video signal, they are corresponding latticed pictures. If any in a set of corresponding latticed pictures has a horizontal picture resolution or vertical picture resolution that is different from any of the others in the set, the corresponding latticed pictures are said to be non-congruent corresponding latticed pictures. Congruent corresponding latticed pictures have the same picture resolution. Throughout this specification, the term "corresponding latticed pictures" refers to congruent corresponding latticed pictures unless expressed otherwise (e.g., as non-congruent corresponding latticed pictures). Congruent or non-congruent processed corresponding latticed pictures are respectively congruent or non-congruent corresponding latticed pictures in compressed form.

Throughout this specification reference to corresponding latticed pictures in the context of corresponding latticed pictures that have been compressed or processed should be understood as corresponding latticed pictures in their compressed form (or processed form). For instance, reference to any LVR received in a receiver should be understood to mean a received PLVR. Unless otherwise specified, terminologies used for latticed pictures similarly apply to them when they become processed latticed pictures. For instance, corresponding processed latticed pictures are corresponding latticed pictures in processed form. Congruent or non-congruent processed corresponding latticed pictures may be respectively congruent or non-congruent corresponding latticed pictures in compressed form.

A complete set of corresponding latticed pictures has a collective number of pixels equal to ip_NP, and the composition of the set of corresponding latticed pictures forms a picture of resolution ip_H by ip_V without performing upscaling or pixel replication operations. A complete set of non-congruent corresponding latticed pictures is as a complete set of corresponding latticed pictures except that at least one of the corresponding latticed pictures has a picture resolution that is different from at least one of the others in the set of corresponding latticed pictures. Similar definitions apply to processed latticed pictures since they are just latticed pictures in processed form.

A set of p LVRs of the input video signal forms a complete representation set of the input video signal if all of the following are satisfied:

1. For each picture of the input video signal there is a set of p corresponding latticed pictures;
2. Every set of p corresponding latticed pictures has a collective number of pixels equal to ip_NP; and
3. Composition of every set of p corresponding latticed pictures forms a picture of resolution ip_H by ip_V without performing upscaling or pixel replication operations.

That is, in a complete set of LVRs, each successive picture of the input video signal is latticed into p corresponding latticed pictures and performing the counter operation of latticing on the p corresponding latticed pictures, de-latticing, results in a reconstructed picture of picture resolution ip_H by ip_V, and that is fully populated with pixels generated from the de-latticing of the p corresponding latticed pictures, without having to improvise for missing pixel values with upscaling or pixel replication operations. A complete set of non-congruent LVRs is similar except that each successive picture of the input video signal is latticed into p non-congruent corresponding latticed pictures. Unless otherwise specified, in this specification it should be assumed that each successive picture of the input video signal is latticed into the same p lattice structures.

An independent set of PLVRs is one in which each of the p PLVRs can be independently decompressed from the other PLVRs in the set. A complete independent set of PLVRs conforms to both the complete set property and the independent set property.

A nearly-independent set of PLVRs is one in which each but one of the PLVRs in the set can be decompressed independently from the other PLVRs in the set. A complete nearly-independent set of PLVRs is a nearly-independent set of PLVRs with the completeness set property, thus, producing full picture resolution, ip_H by ip_V, for every picture.

A partially-independent set of PLVRs is one in which not all of the PLVRs in the set can be decompressed independently from the other PLVRs in the set, but at least two of the PLVRs in the set can be decompressed independently.

A complete set of p PLVRs is said to have R independently decodable PLVRs if for R<p, each of (p−R) PLVRs in the set depends on the information of at least one or more of the other (p−1) PLVRs for its decompression.

For purposes of illustrating a particular embodiment, let picture (k, v) represent the k-th compressed picture in transmission order of a given PLRV, v. For nf (number of pictures) equal to a positive integer, a segment of nf consecutive compressed pictures of a first PLVR is said to correspond to a segment of nf consecutive compressed pictures of a second PLVR if for each integer value of k from 1 to nf, the respective k-th compressed pictures in transmission order are corresponding latticed pictures in compressed form. Similarly, a plurality of segments from respectively corresponding PLVRs are said to be corresponding segments if all possible pairing of two of the plurality of segments are corresponding segments. Corresponding segments must have the same number of pictures, nf, and in transmission order, for each integer value of k from 1 to nf, the kth compressed picture in each of the corresponding segments must be a corresponding picture to the respective kth compressed picture in each of the other segments. In other words, if each successive picture in segments from respective PLVRs originated from the same pictures of the input video signal, the segments are corresponding segments.

A complete set of corresponding segments corresponds to a complete set of PLVRs. The successive corresponding processed latticed pictures (in transmission order) in a complete set of corresponding segments are a complete set of corresponding latticed pictures.

Corresponding segments or the segments in a complete set of corresponding segments may be separated from each other in a video stream so that a data loss during a given time interval will not corrupt all of the processed latticed pictures associated with and originating from the same picture of the input video signal. Consequently, missing or corrupted portions of a compressed latticed picture may be concealed via various mechanisms, including linear or nonlinear interpolation or picture upscaling, at the receiver. Hence, this embodiment combines error correction and error concealment to facilitate resilient robust transport of video over a lossy channel or network, such as an Internet Protocol (IP) packet-switched network. Certain embodiments discussed herein may be particularly useful in applications involving broadcasting video via packet-switched networks, also called over-the-top video transmission.

The respective segments of PLVRs are carried in a video stream in a determined order and/or organization arrangement in accordance to one or more objectives. In some embodiments, the determined order and/or organization arrangement of sequentially ordered segments is intended for error resiliency purposes. In some embodiments, the ordering and/or organization arrangement of the segments is according to the error characteristics of the transmission channel and/or network. In other embodiments, the determined order and/or organization arrangement of sequentially ordered segments is intended to facilitate rapid random access or fast channel change time. In yet other embodiments, the determined order and/or organization arrangement of sequentially ordered segments is for both: error resiliency reasons and fast channel change time (or as random access of the video program).

A segments-distribution interval (SDI) in a video stream is an interval that satisfies all of the following:

1. Contains a plurality of sequentially ordered non-overlapping segments corresponding to processed video representations of the input video signal;
2. Contains not more than one picture that originated from the same picture of the input video signal;
3. Every possible pairing of two consecutive segments in the SDI corresponds to two different processed video representations of the input video signal;
4. The picture output span of the SDI, which is the temporal span in output order of all the pictures in the SDI, referred to herein as the SDI output span, divided by the number of different processed video representations of the input video signal in the SDI equals an integer;
5. The SDI output span corresponds to a time-contiguous picture output span, and over the SDI output span each of the pictures in the SDI is intended to be output in its decompressed form (or as information derived from its decompressed form) at most once, except for when a corresponding "picture output command or information" received in the SDI conveys to repeat a field of the respective output picture or the respective output picture to fulfill the intended contiguous output of pictures.

Steps 4 and 5 assume the intended content of the SDI without impairments. Step 2 expresses that each of the processed pictures of the segments in an SDI originates from a different picture of the input video signal. That is, each compressed picture in the SDI respectively corresponds to a picture of the input video signal. As expressed in Step 1, the sequentially ordered segments in an SDI are non-overlapping. In other words, the first portion of information of each successive segment in the SDI is not provided in the video stream until the information of the prior segment is completely provided.

As is well-known in the art, pictures in encoded video streams may be provided (e.g., transmitted) in a transmission order or decode order that differs from their output order (i.e., display order).

A latticed video SDI (LVSDI) is an SDI in which all pictures in the SDI are processed latticed pictures. In other words, an LVSDI in a video stream is an interval that satisfies all of the following:

1. Contains a plurality of sequentially ordered non-overlapping segments corresponding to processed video latticed representations of the input video signal;
2. Contains no corresponding processed latticed pictures;

3. Every possible pairing of two consecutive segments in the SDI corresponds to two different processed LVRs;

4. The LVSDI output span divided by the number of different processed LVRs in the LVSDI equals an integer;

5. The LVSDI output span corresponds to a time-contiguous picture output span, and over the LVSDI output span each of the latticed pictures in the LVSDI is intended to be output in its decompressed form (or as information derived from its decompressed form) at most once, except for when a corresponding "picture output command or information" received in the LVSDI conveys to repeat a field of the respective output picture or the respective output picture to fulfill the intended contiguous output of pictures.

Again, Steps 4 and 5 assume the intended content of the LVSDI without impairments. Step 2 expresses that each of the processed latticed pictures of the segments in an LVSDI originates from a different picture of the input video signal.

A congruent LVSDI is an LVSDI in which all the pictures in the SDI are processed latticed pictures and have the same picture resolution. A non-congruent LVSDI contains at least one processed latticed picture with picture resolution that is different from any of the other processed latticed pictures in the LVSDI. Throughout this specification, LVSDI refers to a congruent LVSDI unless expressed otherwise (e.g., as a non-congruent LVSDI).

A completely-represented LVSDI (CRLVSDI) is an LVSDI that contains at least one segment from each respective PLVR of a complete set of p PLVRs. Recall that the segments in an LVSDI are non-corresponding segments by definition.

The minimum set of successive CRLVSDIs, MinC, is the minimum number of contiguous CRLVSDIs in the video stream to provide the complete corresponding segments for each segment in each CRLVSDI.

In one embodiment, the segments of plural PLVRs are provided (or received) in a video stream according to a first temporal order that specifies a temporal relationship between one or more segments, and possibly all of the segments, included in each successive SDI in the video stream. In one embodiment, the SDIs are a complete set of p congruent PLVRs and the first temporal order specifies the order of the p non-corresponding segments in each successive LVSDI, which in this case is a CRLVSDI. A second temporal order may further specify the order of each set of p corresponding segments over each set of p successive CRLVSDIs in the video stream (i.e., MinC=p).

Figure 3A:
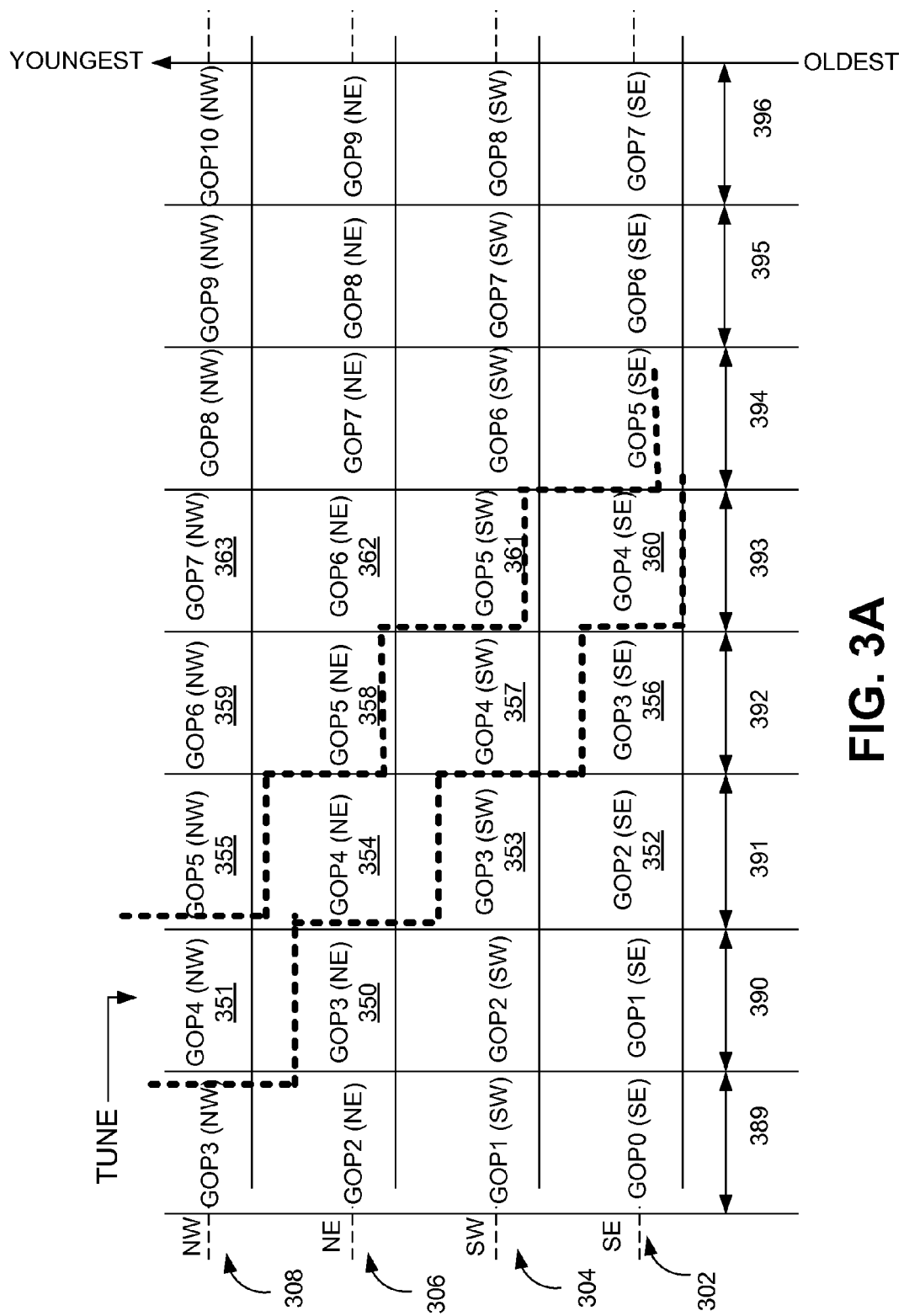
FIGS. 3A-3B are schematic diagrams that illustrate the temporal order relationship of segments of respective processed latticed video representations.

In FIG. 3A, eight CRLVSDIs are respectively numbered as 389, 390, 391, 392, 393, 394, 395, and 396. MinC equals four to obtain a single set of complete corresponding segments. It should be noted that the order of the segments in the video stream in each CRLVSDI shown in FIG. 3A is from bottom to top (or oldest to youngest, as discussed further below). GOP4-NW 351, GOP4-NE 354, GOP4-SW 357, and GOP4-SE 360, which are respectively in segment-distribution intervals (e.g., CRLVSDIs) 390, 391, 392, 393, and which correspond to PLVRs 308, 306, 304, 302, respectively, make up complete corresponding segments. At the time GOP4-SE 360 is provided or received, the other three corresponding segments are intended to have already been provided or received (e.g., in receiver 14 of FIG. 1) and the GOP-4 pictures may be output at full picture resolution (i.e., the picture resolution of the input video signal). For example, receiver 14 can perform decoding in decoder 34 of the four received GOP-4 representations and then their de-latticing or composition performed in video de-latticer 42. Likewise, complete corresponding segments, GOP5-NW 355, GOP5-NE 358, GOP5-SW 361, and GOP5-SE, are provided in CRLVSDIs 391, 392, 393, and 394. Thus, the next minimum set of successive CRLVSDIs overlaps the prior set of successive CRLVSDIs over the last set's last (p−1) CRLVSDIs, which in FIG. 3A, p=4.

Continuing with FIG. 3A, after a channel change or a random access operation into the video stream, complete (or full) pictures become available for output no later than after the p-th CRLVSDI.

It should be noted in FIG. 3A that upon a channel change or random access operation, the video stream can be accessed at the first available CRLVSDI and decoding can start with the next (e.g., oldest) PLVR (e.g., PLVR 302), which is received when the next CRLVSDI in the video stream starts. In the worst case, pictures can be output at one p-th (e.g., one fourth in the present example) of the full resolution of the input video signal, such as when accessing or tuning into the video stream while GOP4-NW 351 is being transmitted within CRLVSDI 390. In such case, pictures corresponding to segment GOP2-SE352 are the first from PLVR 302 to arrive at receiver 14, and thus they are the first to be decompressed and output. Since the pictures of GOP2-SE 352 represent incomplete picture data, or one-fourth of the full picture resolution of the input video signal, the compressed latticed pictures in segment GOP2 SE are decompressed and de-latticed and then upsampled with preferred upsampling methods in receiver 14. GOP3 is processed and output immediately after GOP2 processed latticed pictures. Since GOP3-SW 353 is provided or received prior to its corresponding segment, GOP3-SE 356, fifty percent of the information of the intended full picture resolution is contributed to the output pictures that correspond to GOP3. GOP4 is processed and output immediately after GOP3 pictures. Since corresponding segments, GOP4-SW 357 and GOP4-NE 354, are provided or received previously in the video stream, 75 percent of the pixels of the full picture resolution are contributed from each successive set of three corresponding decompressed latticed pictures to the reconstruction of output pictures that correspond to GOP4. GOP5 can then be output using pixels from successive sets of four (or p) corresponding decompressed latticed pictures, and thus, the GOP-5 pictures can be output as complete pictures without reliance on upsampling operations to improvise for missing information.

In the previous example, upon a channel change, the picture fidelity increases gracefully from one quarter of information provided from decompressed PLVR information, and the remainder of the missing pixels in the full resolution picture populated with upsampling or pixel replication methods, to half, to three-fourths, to full information provided for picture reconstruction, when no upsampling or pixel replication methods are required from then on.

The GOP2-SE processed latticed pictures, or any single segment of a PLVR that is decoded and upsampled for output provide the lowest picture fidelity level among a finite set of picture fidelity levels. In this case, there are four (or p) picture fidelity levels that correspond to the percentage of pixels of the intended full resolution of the output picture that are contributed from decompressed corresponding latticed pictures. The maximum amount of pixels results when the complete set of four (or p) decompressed corresponding latticed pictures are available to populate the intended full resolution of the output picture. The lowest picture fidelity level results when a single decompressed latticed picture (i.e., 25 percent of information) is available to reconstruct the intended full resolution of the output picture. When two or three decompressed corresponding latticed picture are available, 50 or 75 percent of the information of the intended full resolution is contributed to the output picture, respectively.

If accessing or tuning into the video stream transpires while GOP3-NE is being transmitted within CRLVSDI 390, GOP2-SE is first output by upsampling one fourth of picture information to the intended output picture size. As in the prior example, the progression of improved picture fidelity increases by contributing fifty percent of the intended pixel population of the output pictures corresponding to GOP3. Another fifty percent of upsampled pixel information obtained with preferred upsampling methods applied to the contributed fifty percent of populated information result in full resolution output pictures. However, unlike the prior example, GOP-4 pictures can be output using pixels from the four (or p) PLVRs since they are all available for decompression and de-latticing. In this example, full-picture reconstruction was acquired after the third CRLVSDI rather than the fourth CRLVSDI. Furthermore, the picture fidelity increases gracefully from:

1. one quarter of contributed information to the output pictures, with the remainder of the information in the output GOP-2 pictures obtained by upsampling, to
2. contributing half of the information to the output pictures, with the remainder of the information in the output GOP-3 pictures obtained by upsampling, to
3. full information contribution for the reconstruction of the output of GOP4 pictures, when no upsampling or pixel replication methods are required from then on.

If accessing or tuning into the video stream transpires while GOP2-SW is being transmitted within CRLVSDI 390, as previously discussed, GOP2-SE is first output by upsampling one fourth of picture information to the intended picture size. However, the progression of improved picture fidelity increases to 75 percent of intended pixel population in the output pictures corresponding to GOP3 since corresponding segments GOP3-SE, and GOP3-SW, and GOP3-NE have been provided or received. GOP-4 pictures can be output using pixels from the four (or p) PLVRs since the complete set of corresponding segments are available for decompression and de-latticing. In this example, full-picture reconstruction was acquired on the third CRLVSDI and not over four CRLVSDIs. Furthermore, the picture fidelity increases gracefully from one quarter of information contribution to the output picture, to 75 percent of the information contributed, to full intended picture reconstruction without upsampling or pixel replication required from then on.

If accessing or tuning into the video stream transpires not prior but while GOP1-SE is being transmitted within CRLVSDI 390, GOP2-SE is first output but now with 50 percent of the intended pixel information (and the rest by upsampling information) due to the fact that GOP2-SW was already received. The progression of improved picture fidelity increases to 75 percent of intended pixel population in outputting GOP-3 pictures and then to full pictures when outputting GOP-4 pictures. In this example, full-picture reconstruction was acquired again on the third CRLVSDI and not over four CRLVSDIs. However, the picture fidelity increases gracefully from pictures reconstructed from half the amount of the intended pixel information for GOP2 pictures, to 75 percent of the intended information for GOP3 pictures, to full intended picture reconstruction for the GOP4 pictures.

Figure 3B:
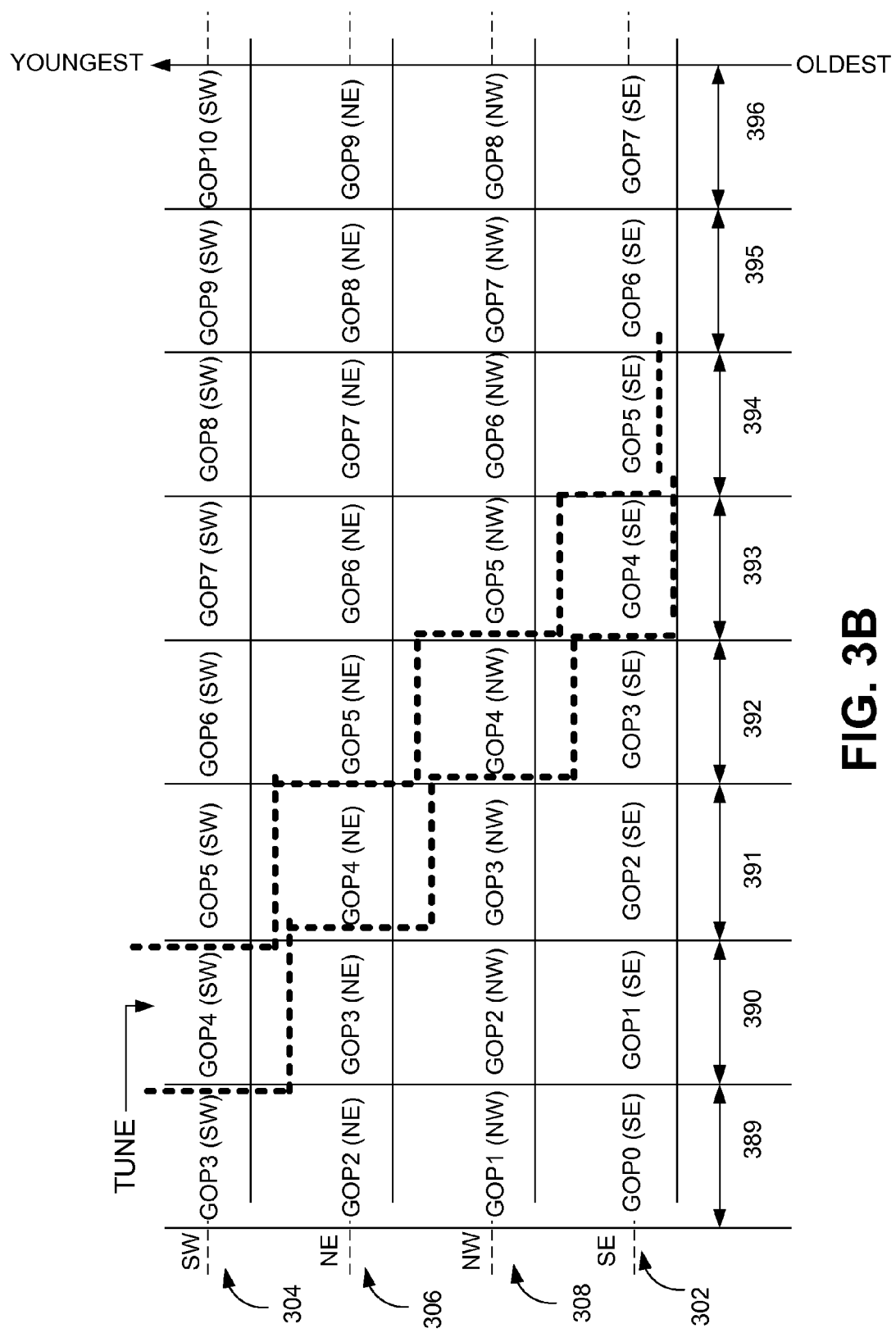

FIG. 3B is similar to FIG. 3A except with a different PLVR ordering, and hence discussion is omitted for brevity.

Note that FEC techniques may be applied to a given video stream to be transmitted over a network. Application of FEC to a video stream involves adding redundant data in the form of repair symbols to the video stream to reduce or eliminate the need to retransmit data in the event of certain types of data loss. The repair symbols facilitate reconstructing the video stream at a receiver in the event of data loss. Data may be lost due to noise, differing IP routing convergence times, Raleigh fading in wireless networks, and so on. Application of FEC to a video stream may also include the correction of lost data or other errors in a video stream using the repair symbols.

Unfortunately, due to excessive overhead and bandwidth constraints of many communications systems, certain conventional FEC systems often do not correct or adequately compensate for large losses, such as, by way of non-limiting example, burst correlated losses of more than 500 milliseconds, without excessive transmission overhead and receive buffer delays. This may result, for example, in undesirable blanked pictures in the transported video stream and corresponding black screens in the resulting displayed video signal. Such problems may be addressed by certain embodiments discussed herein.

For clarity, various well-known components, such as video amplifiers, network cards, routers, Internet Service Providers (ISPs), Internet Protocol SECurity (IPSEC) concentrators, Media GateWays (MGWs), filters, multiplexers or demultiplexers, transport streams, and so on, may be incorporated in some embodiments and hence have been omitted from the figures. However, those skilled in the art with access to the present teachings will know which components to implement and how to implement them to meet the needs of a given application.

For the purposes of the present discussion, electronically transported data may be any data that is communicated from a first location to a second location via electromagnetic energy. Examples of electronically transported data include data transferred over packet-switched networks via Internet Protocol (IP), broadcast networks (e.g., terrestrial, cable or satellite), data transferred via circuit-switched networks, such as the Public Switched Telephone Network (PSTN), and data transferred wirelessly using a wireless protocol, such as Code Division Multiple Access (CDMA), Advanced Mobile Phone Service (AMPS), WiFi (Wireless Fidelity), WiMAX (Worldwide Interoperability for Microwave Access), and Bluetooth protocols.

An example method includes receiving an input video signal with one or more successive uncompressed pictures; separating each of the one or more successive pictures of the input video signal into a complete set of p corresponding latticed pictures; compressing the successive latticed pictures of each LVR of the resulting complete set of LVRs to obtain a complete set of PLVRs, then segmenting the complete set of PLVRs into contiguous non-overlapping corresponding segments, and then ordering and/or arranging each successive set of p corresponding segments in each successive non-overlapping set of p consecutive non-overlapping SDIs in the video stream according to a first temporal order. In an alternate embodiment, rather than employing the first temporal order, p non-corresponding segments respectively corresponding to each of the plural PLVRs are arranged in each successive SDI in the video stream in accordance with the definition of CRLVSDI, and further in accordance with maintaining continuity in picture from each segment in the SDI to the next non-overlapping segment in the SDI. That is, the segments are ordered within the SDI such that the first picture output from each succeeding segment in the SDI has a presentation time, or PTS, (e.g., as specified in MPEG-2 Transport) immediately after the presentation time (i.e., output time) of the last picture output from the prior segment in the SDI. The aforementioned ordering of consecutive segments of each of the p PLVRs are strategically ordered over consecutive SDIs but because each SDI contains multiple segments, and each of the segments do not overlap in the SDI, and consecutive SDIs do not overlap, consecutive segments of the same PLVR are separated by segments of other PLVRs in the video stream. Furthermore, according to the definition of SDI, corresponding segments are also separated by segments of other PLVRs. Thus, segment ordering in the video stream is performed before transmission aiming to facilitate error correction and/or error concealment.

Another mechanism sequences (e.g., including ordering) corresponding segments of plural PLVRs of at least a portion of a video program, the sequencing representing a non-multiplexed ordering of segments of plural PLVRs borne from a video program. These sequenced segments are provided in the disclosed embodiments in a single video stream to the receiver or receivers, such as shown in FIG. 4B, described further below. Such a single video stream may be referred to as a single aggregated video stream or aggregated video stream throughout this specification because it includes the aggregated segments of plural PLVRs.

Another mechanism employs sequencing of segments according to the proportioned bit allocation of the different picture types or of pictures of different levels of importance whereby different quantities of bits are allocated for different picture types and/or pictures (of the same or different picture types) having different relative picture importance.

Another mechanism improves error resiliency by promoting pictures from a first relative importance or picture type (e.g., the oldest PLVR) and demoting pictures of a second relative picture importance or picture type from one or more of the other (non-oldest) PLVRs. These and other mechanisms are described in further detail below.

FIG. 1 is a diagram of a communications system 10 employing video latticing, video coding functionality, and sequentializing (including ordering and/or time shifting in some embodiments) of respective sequences of processed latticed pictures according to an example embodiment. In some embodiments, segments may be ordered prior to being input to the encoder 20, as explained above. The communications system 10 includes a transmitter 12 in communication with a first receiver (receiver 1) 14 and a second receiver (receiver 2) 30. For the purposes of the present discussion, a communications system may be any device or collection of devices that contains one or more components that intercommunicate or are otherwise adapted to intercommunicate. In a specific embodiment, an apparatus for processing and transmitting visual information is disclosed. Visual information may be any information from an information source such as from a camera, scanned from film, or synthetically created to form an image or portion thereof. The terms "visual information" and "image data" are employed interchangeably herein. In a specific embodiment, the apparatus includes a first mechanism for mapping plural matrices onto each successive picture of the input video signal (e.g., picture 60 of FIG. 2).

The transmitter 12 includes a video-latticing module or video latticer 16, which is coupled to a video encoder 20, which in turn is coupled to a sequentializer 18 (which in one embodiment imposes a time shift and ordering of the respective segments of PLVRs). Note that the particular arrangement of devices of the transmitter 12 can be re-ordered in some embodiments, and no particular order of functionality is intended to be implied for all embodiments by the configuration shown in FIG. 1. In addition, functionality of one or more components of the transmitter 12 may be combined in some embodiments in a single component, or in some embodiments, distributed among two or more of these or other components residing within and/or outside of the transmitter 12. The transmitter 12 includes various components not shown in FIG. 1, including, for instance, one or more video-compression modules coupled to a transmit chain. The transmit chain may include an FEC module. In one embodiment, the transmitter 12 includes filtering capabilities. Such filtering capabilities may include linear, non-linear, or anti-aliasing filtering capabilities.

A first latticed picture is said to correspond to a second latticed picture if they both originated from the same picture of the input video signal. Corresponding latticed pictures are temporally aligned to the same instance or interval of time for display or output purposes since they originated from the same picture.

Depending on the embodiment, sequentializing (including ordering and/or time-shifting) of latticed pictures or video segments may occur before, during, or after their compression.

The encoder 20 (e.g., video compression functionality residing in the encoder) outputs the successive compressed latticed pictures corresponding to each of the p LVRs in accordance with the syntax and semantics of a video coding specification. In one embodiment, segments are provided sequentially, where each segment consists of plural compressed pictures from the same LVR. The transmission order of the successive compressed latticed pictures in a PLVR may or may not equal the display or output order of the pictures. For example, in certain applications, a future reference picture may be required to be transmitted prior to a picture having an earlier display or output time, but that depends on the decoded version of that future reference picture for its reconstruction. The encoder 20 effects compression of the p LVRs such that, in one embodiment, the relative transmission order of the successive compressed latticed pictures in each of the corresponding p PLVRs is the same. However, in the present embodiment, although the relative transmission order of the processed latticed pictures within each of the p PLVRs is the same, as explained below, each set of p corresponding segments is transmitted in accordance with a second relative temporal order, which is a re-ordered and/or time-shifted version of the order of contiguous segments.

The transmitter 12 is coupled to the first receiver 14 and the second receiver 30 via a network 32. The network 32 may be the Internet, a wireless network, or other type of network or communications channel(s). Although multiple receivers or decoders are described herein, other embodiments may use a single decoder or receiver.

The first receiver 14 includes a first decoder (decoder 1) 34, which is coupled to a first video de-latticer (video de-latticer 1) 42, which is coupled to a first loss-concealment and latency-compensation module (LCALCM1) 44. The first decoder 34 includes various functionality, including a first receive chain, which may include a first reverse-FEC module (not shown), and which is further coupled to a first video-decompression module (VDM) 54 residing in the first decoder 34. The first decoder 34 is coupled to the first video de-latticer 42, which is coupled to the first LCALCM1 44. The second receiver 30 is similar to the first receiver 14, and hence further description of the same components is omitted here and elsewhere for brevity, with the understanding that discussion corresponding to decoder 34, first video de-latticer 42, and LCALCM1 44 likewise applies to the corresponding components in receiver 30.

For the purposes of the present discussion, plural PLVRs are output from the transmitter 12 as a single video stream, successively transmitted as portions of video data, such as, but not limited to, the sequential, non-overlapped compressed latticed pictures.

In one embodiment, plural separate video segments are ordered and/or time shifted in non-overlapping manner (i.e., sequenced) into a single video stream and then transmitted over a single transmission channel. Auxiliary information is provided in or associated with the video stream to identify the segments of the respective PLVRs. The auxiliary information may include information indicating how decoded versions of compressed latticed pictures are to be assembled into the intended full picture resolution of output pictures.

Auxiliary information in or associated with the video stream provides identification information that conveys spatial relationships of the lattices and the relative temporal order of the segments of PLVRs. For purposes of the present discussion, the relative temporal order of segments may specify the actual order of the start, end, or completion of each of the segments in successive SDIs, and/or each corresponding processed picture in the video stream and may further specify the minimum set of successive CRLVSDIs. The relative temporal order of segments or pictures is said to be relative, since they are ordered or positioned for transmission with respect to each other within SDIs or over a minimum set of successive SDIs.

The LCALCM1 44 (and corresponding component in receiver 30) are error-concealment modules. For purposes of the present discussion, an error-concealment module may be any entity that is adapted to disguise an impairment in a video stream, such as omitted data, lost data, impaired data, or data that has not yet been received by a receiver, or other errors occurring in the transmission or reception of a video stream. Herein, an impairment refers to omitted data, lost data, impaired data, or data that has not yet been received by a receiver, or to other errors occurring in the transmission or reception of a video stream.

The LCALCM1 44 includes filtering capabilities, such as linear, non-linear or anti-aliasing filtering capabilities to effect upscaling of a decoded latticed picture. The filtering capabilities in the LCALCM1 44 may compensate for lost data, impaired data, or non-received data. For example, filtering capabilities may be employed to upscale at least a portion of a decoded latticed picture in a first PLVR to conceal an impairment in a corresponding latticed picture. For the purposes of the present discussion, data is said to be upscaled when deriving or replicating data to compensate for an impairment of data.

The filtering capabilities in the LCALCM1 44 may be employed to upscale at least a portion of a decoded version of latticed picture (k, 1), such as the SW latticed picture, that spatially-corresponds to the impaired portion of latticed picture (k, 2), such as the NE latticed picture. For instance, in reference to FIG. 2, some or possibly all of the generated pixel values in the upscaled version of a decoded latticed picture (k, 1) are used to compensate for the corresponding pixels of at least one impaired portion of the decoded version of latticed picture (k, 2) or the whole of latticed picture (k, 2) if latticed picture (k, 2) was completely impaired or undecodable.

In one embodiment, when latticed picture (k, 2) is impaired, a single decoded non-impaired latticed picture, e.g., latticed picture (k, 1), is upscaled in LCALCM1 44 to compensate for the respective one or more spatially-corresponding impaired portions in latticed picture (k, 2). Alternatively or in addition, when latticed picture (k, 2) exhibits one or more partial-picture impairments, one or more portions of a single decoded non-impaired latticed picture, e.g., latticed picture (k, 1), are upscaled in LCALCM1 44 to compensate for the respective spatially-corresponding impaired portions in latticed picture (k, 2).

In another embodiment, p PLVRs and identification information are received at the first receiver 14. Filtering capabilities in LCALCM1 44 are used to upscale the decoded versions of (p−1) non-impaired corresponding compressed latticed pictures to compensate for one or more impairments in the corresponding p-th compressed latticed picture. For purposes of the present discussion, the respective k-th compressed latticed pictures in each of p received PLVRs are corresponding compressed latticed pictures. The relative temporal order of the p corresponding k-th compressed latticed pictures is determined by the first receiver 14 from the received identification information, i.e., auxiliary information, such as PTS. The p corresponding k-th compressed latticed pictures may be determined by the first receiver 14 from the PTS or output order information of the p corresponding compressed latticed pictures (or corresponding p segments). The corresponding p compressed latticed pictures are decoded by the first decoder 34 in accordance with their relative temporal order. The spatial relationships of the decoded versions of the p corresponding k-th compressed latticed pictures are also determined by the first receiver 14 from the same received identification information.

In an alternate embodiment, the spatial relationships of the decoded versions of the p corresponding k-th compressed latticed pictures are determined by the first receiver 14 from additional or different auxiliary information that differs from the received identification information described above. A composite or assembled output picture of the same spatial resolution as the input video signal 11 to the transmitter 12 is formed by the first video de-latticer 42 in accordance with the spatial relationships determined from the identification information or from the additional or different auxiliary information. One or more of the (p−1) corresponding decoded latticed pictures are individually upscaled in the LCALCM1 44 to compensate for one or more impairments in the k-th compressed latticed picture of the p-th PLRV. Similarly, when two corresponding compressed latticed pictures in the received video stream exhibit impairments, one or more of the (p−2) corresponding decoded latticed pictures are individually upscaled to compensate for the impairments.

Note that various couplings between modules and groupings of modules shown in FIG. 1 are for illustrative purposes. Those skilled in the art may employ different couplings and groupings without departing from the scope of the present teachings. The exact couplings and order of various modules of FIG. 1 are application specific and may be readily changed to meet the needs of a given application by those skilled in the art without undue experimentation.

In operation at the transmitter 12, the video latticer 16 receives a video signal 11 as input. In the present embodiment, the input video signal is a digitized and uncompressed video signal that is ingested as a sequence of successive pictures in their temporal display or output order and in accordance with a digital video or video interface specification. The digital video or video interface specification may specify use of a pixel clock, a picture format, a number of pictures per second, a pixel format, and/or the scan or serial order of the pixels of the successive pictures, or other attributes and values. The scan format of the input video may correspond to a progressive or interlaced video signal. The resulting ingested video signal is said to include or represent video data. The exact picture format, number of pictures per second, pixel format, and scan format of the received video data may be application specific. Different types of video formats may be used for different applications.

The video latticer 16 may be any hardware and/or software device, collection of devices, or other entity that is adapted to subsample, identify, separate, or mark different lattices of a video signal. The video latticer 16 includes circuitry and instructions, which may include one or more software and/or hardware routines for selectively latticing the successive pictures of the input video signal, thereby separating them into different latticed pictures. In the specific embodiment of FIG. 1, the video latticer 16 samples each input picture to obtain smaller latticed pictures. The latticed pictures include pixel information from particular sampling regions, which represent sets of predetermined spatial locations of pixels, where the pixels are selected from matrices of each input picture.

In another example embodiment, each successive picture of the input video signal is separated into p (e.g., four) different lattices output by the video latticer 16.

The pixels selected for each of the p latticed pictures are dispersed across a picture in accordance with the mapping of the non-overlapping contiguous n-pixels matrices on the picture. For example, in one operational mode where the number (n) of pixels in each matrix is four (n=4) and the number (p) of LVRs formed from the input video signal is four (p=4), an input picture with a picture resolution of 640 pixels in the horizontal and 480 pixels in the vertical is mapped with a 320 by 240 grid of 2×2 matrices, and thus, the picture is divided into different groups (matrices) of four pixels. Each 2×2 matrix contains four "adjacent" or neighboring pixels per the meaning of adjacency described below. Each pixel in a 2×2 matrix is allocated to one of the four lattices, which are each conveyed via one of the four LVRs. Note that a picture may be mapped with matrices of different sizes and shapes other than 2×2 pixel matrices without departing from the scope of the present teachings.

A pixel is said to be spatially adjacent, or adjacent, to another pixel if they are positioned directly next to each other, either horizontally or vertically. In an alternate embodiment, pixels may be also considered adjacent if diagonally next to each other. For example, two pixels may be considered adjacent if at least one corner of a first pixel is adjacent to at least one corner of a second pixel.

Each matrix in the mapped two-dimensional grid of non-overlapping contiguous matrices on an input picture corresponds to a sampling region, where the sampling region represents the locations of the pixels of the matrix. The shape of a sampling region corresponding to a mapped matrix may be square, rectangular, linear, or polygonal. In the present specific embodiment, the sampling regions have horizontal and vertical edges as defined relative to edges of a picture.

Two adjacent mapped matrices separate adjacent pixels located across their horizontal or vertical edges. In one embodiment, each mapped matrix in a picture is adjacent to at least one other mapped matrix. Alternatively, each mapped matrix in a picture is adjacent to at least two other different mapped matrices. Alternatively, each mapped matrix in a picture is horizontally adjacent to at least one other mapped matrix and vertically adjacent to at least one other mapped matrix. Alternatively, each mapped interior matrix in a picture is adjacent to at least four other different mapped matrices. The borders of an interior matrix do not coincide with or are not adjacent to any portion of a picture's borders.

In one embodiment, all of the mapped matrices onto a picture have the same shape and size. In an alternative embodiment, alternating mapped matrices in scan order differ in size. In another embodiment, the alternating mapped matrices in scan order differ in shape. In another embodiment, the alternating mapped matrices in scan order differ in position within a picture. In another embodiment, the alternating matrices in scan order differ in shape and size. In another embodiment, the alternating matrices in scan order differ in shape and position. In another embodiment, the alternating matrices in scan order differ in size and position. In yet another embodiment, the alternating matrices in scan order differ in size, shape, and position. Hence, successive mapped matrices in scan order may differ in shape and/or size and/or position without departing from the scope of the present teachings.

In one embodiment, the mapped matrices onto a picture do not overlap. In an alternative embodiment, the mapped matrices onto a picture overlap. Hence, mapped matrices may or may not spatially overlap.

Each mapped matrix contains n pixels that are processed by the video latticer 16 to form p lattices, and, thus, p corresponding latticed pictures. In one embodiment, the number of pixels in a mapped matrix equals the number of lattices (i.e., n=p), and the latticed pictures are congruent. In an alternative embodiment, p is less than n, and n/p is an integer, and the p lattices have the same picture resolution, resulting in p congruent LVRs which are also a complete set of LVRs. That is, the video latticer 16 may distribute (n/p) pixels from each mapped matrix into each of the p lattices.

In yet another embodiment, p is less than n, and n divided by p does not equal an integer number, and at least one of the p lattices has a picture resolution that is different from the respective picture resolution of the other corresponding latticed pictures. Thus, the resulting LVRs are non-congruent.

Note that in certain embodiments or implementations, the video latticer 16 may include methods or instructions for selectively adjusting the latticing patterns or mapped matrices employed by the video latticer 16 according to one or more predetermined criteria. For example, the latticing patterns may be selected so that any data loss is more easily concealed or disguised based on one or more characteristics of human perception. For example, humans may not be able to perceive an improvised reconstruction of lost pixel data occurring along a diagonal direction of pixels in a picture or display screen as easily as they may be able to perceive lost pixel data occurring horizontally or vertically across a display screen. Accordingly, the latticing patterns may be selected to force data losses within a predetermined time interval to occur in patterns other than horizontal or vertical lines In the present specific embodiment of FIG. 1, the video latticer 16 outputs p separate LVRs derived from the input video signal 11, which may be in the form of a sequence of digitized uncompressed pictures in the native display order of the successive pictures of the input video signal.

Output LVRs are provided to the encoder 20. In one embodiment, the p separated LVRs are provided to the encoder 20 in parallel (i.e., at the same time) to produce respective PLVRs. The encoder 20 compresses the LVRs, hence converting them into respective PLVRs having compressed segments, each corresponding to a predetermined picture output span or a predetermined number of consecutive compressed latticed pictures in transmission order. For instance, in one embodiment, each segment corresponding to a respective LVR corresponds to a GOP. The compressed segments are provided to the sequentializer 18, which arranges and orders the segments in a non-overlapping manner over a set of p successive non-overlapping SDIs of the video stream. The arrangement and ordering of the segments comprises of ordering p non-corresponding segments consecutively (and in a non-overlapping manner) in each of the p successive non-overlapping SDIs, and by separating each set of p corresponding segments into the respective set of p successive non-overlapping SDIs. The separation imposes a time delay among corresponding segments in the video stream due to the fact that they are interspersed by non-corresponding segments. The arrangement and ordering operation of p multiplied by p segments (e.g., 16 segments when p=4) in sequentializer 18 is further according to satisfying all of the following:

(1) Arranging the p non-corresponding segments in each of the p successive non-overlapping SDIs in a time-continuous order, such that there is picture output continuity from the last picture output from a non-corresponding segment in the SDI to the first picture output from the successive non-corresponding segment in the SDI;

(2) Arranging p non-corresponding segments as the first segment in each of the p successive non-overlapping SDIs in time-continuous order, such that there is picture output continuity from the last picture output from the first segment in an SDI to the first picture output from the first segment in the successive SDI, and all of the p first segments of the p successive non-overlapping SDIs are from the same PLVR.

In addition to the above two arrangement and ordering criteria, in one embodiment, all possible pairings of two consecutive segments provided in the video stream are non-corresponding segments.

Segments arranged and ordered in a video stream are provided for transmission or transmitted over the network 32.

It is noted that the segments corresponding to each of the p PLVRs are sequenced into contiguous non-overlapping SDIs of the video stream such that for all possible pairings of two consecutive segments provided in the video stream the start of the second of the two successive segments in the video stream is after the providing the first of the successive segments in full.

In one embodiment, the number of consecutive processed latticed pictures in each segment of each successive set of p corresponding segments is fixed. In an alternative embodiment, the number of consecutive processed latticed pictures, nf, in two consecutive video segments of a given aggregated video signal changes from a first number to a second number. The change from a first number of consecutive pictures to a second number of consecutive pictures also occurs for the corresponding segments of the other p–1 processed latticed video representations.

The input video signal 11 to transmitter 12 may include a sequence of digitized uncompressed pictures, including video pictures that are mapped, via the video latticer 16, with non-overlapping contiguous matrices containing n pixels each. For an embodiment in which p=n=4, each pixel of each mapped matrix is strategically assigned to a different one of the four parallel LVRs output by the video latticer 16 and then processed by the encoder 20, the corresponding compressed segments further processed by the sequentializer 18. Values of each distributed pixel to a lattice may be altered from the corresponding pixel values of the input video signal by filtering capabilities in video latticer 16.

In an alternative embodiment, a given one of the p LVRs output by the video latticer 16, may include plural lattices. In this case, successive pictures of the input video signal are latticed by allocating unequal number of samples of the sampling matrix to obtain non-congruent corresponding latticed pictures.

In one embodiment where p=n=4 and where each picture is mapped with a two-dimensional grid of non-overlapping contiguous 2×2 matrices, a first latticed video representation of the four latticed video representations output by the video latticer 16 includes one or more pixels located in upper left portion(s) (northwest, NW) of the set(s) of pixel locations corresponding to one or more mapped 2×2 matrices. A second latticed video representation includes one or more pixels located in upper right portion(s) (northeast, NE) of the set(s) of pixel locations corresponding to the mapped 2×2 matrices.

A third latticed video representation includes one or more pixels located in lower left portion(s) (southwest, SW) of the set(s) of pixel locations corresponding to the mapped 2×2 matrices. A fourth latticed video representation includes one or more pixels located in lower right portion(s) (southeast, SE) of the set(s) of pixel locations corresponding to mapped 2×2 matrices. The particular mapping of 2×2 matrices are selectively repeated across each successive picture of the input video signal so that each of the four latticed video representations include a different set of pixels chosen from every other pixel on every other line of each video picture of the input video signal.

Note that more or fewer than four pixels and four different lattices may be employed without departing from the scope of the present teachings. For example, the video latticer 16 may lattice the input video signal into two (instead of four) latticed video representations, which in one embodiment are output in parallel to the encoder 20.

The video latticer 16 provides auxiliary information identifying the arrangement and order of non-corresponding segments in the successive SDIs of the video stream and of the corresponding segments over p successive SDIs of the video stream. The auxiliary information enables the receiver 14 to reconstruct the intended output pictures at their proper output time with information contributed from the decompressed version of one more corresponding latticed pictures of the received segments in the video stream. The identification of different lattices via auxiliary information may be implemented via various mechanisms, such as by insertion of specific identifying packets; by selectively adding or altering packet headers at the transport stream level, the packetized elementary stream level, the coded video layer; or by other mechanisms. Alternatively, identification information is provided in data fields in: a transport stream's packet header or outside a packet payload. In another embodiment, the identification information is provided in data fields in a packetized elementary stream's packet header or outside the packet payload, wherein the packetized elementary stream is carried in the payloads of transport stream packets. In yet another embodiment, the identification information is provided in data fields in a packet header or outside a packet payload of a coded video layer.

Those skilled in the art, in the context of the present disclosure, with access to the present teachings may readily implement video latticing and de-latticing to meet the needs of a given implementation without departing from the scope of the present teachings.

The video latticer 16 may include instructions for separating an input video signal into plural latticed video representations, where each latticed video representation corresponds to one or more lattices derived from one or more corresponding sampling regions of the input video signal.

For purposes of the present discussion, a first of two corresponding segments (e.g., GOPs) is said to be time shifted relative to the second segment (e.g., a GOP) corresponding to the second of the two corresponding segments when a predetermined number of non-corresponding segments are inserted between them in the video stream. Thus, corresponding segments of LVRs are time shifted relative to each other to, for instance, facilitate error concealment in a received video stream in the event of a loss of video data for a predetermined data-loss interval.

A sequentializer 18 may be any hardware and/or software device, collection of devices, or other entity that is adapted to sequentialize (order/arrange and/or time-shift) consecutive segments of each of p plural PLVRs in non-overlapping manner within each successive SDI of the video stream and arrange them across successive SDIs as previously described. The sequentializer module 18, in sequentializing the segments, may indirectly impose a time shift effect, whereby one or more of the plural segments of the different PLVRs are shifted in time (or otherwise) with respect to one or more other segments in the video stream.

In the present specific embodiment, segment arrangement and ordering may be according to the size or amount of time of a transmission channel's predetermined data-loss interval, which can be expressed as a range of values. For instance, the range of values may be larger than approximately 500 milliseconds and less than approximately 2 seconds, as one example implementation among others. One having ordinary skill in the art should appreciate within the context of the present disclosure that other values for the data-loss interval may be employed. A data-loss interval may be any time interval during which data in a video stream exhibits errors, is lost, corrupted, or is otherwise not available. Various mechanisms may cause data loss in a communications channel or network, including burst errors, signal fades, or other data-loss mechanisms.

Parallel latticed video representations output by the video latticer 16 are input to the encoder 20, where video compression functionality may include instructions for compressing pictures of the four latticed video representations. Exact details of compression algorithms employed by the encoder 20 are application specific and in accordance with a video coding specification, such as ISO/IEC MPEG-2 Video (also known as ITU H.262) or ISO/IEC MPEG-4 Part 10 (also known as ITU H.264).

In one embodiment, the encoder 20 outputs compressed video segments, which are received at the sequentializer 18. The sequenced segments are provided to transmit chain functionality of the transmitter 12, which includes various modules and functions used to prepare the sequenced segments for transmission over the network 32. For example, transmit chain functionality may include forward error correction applicable to each of the sequenced segments to be output by the transmitter 12.

FEC involves adding redundant data to a video stream to reduce or eliminate the need to retransmit data in the event of certain types of data loss. The repair symbols facilitate reconstructing the video stream at the receiver in the event of data loss. FEC functionality in the transmitter 12 adds sufficient repair symbols to each segment output as part of the aggregated video stream by the transmitter 12 to enable the receivers 14, 30 to correct for errors or data loss to the aggregated video stream (or portions thereof) within an FEC-protection time interval, also called an FEC protect window. Generally, the FEC-protection time interval is often relatively small compared to a loss-concealment interval implemented by the LCALCMs 44.

Exact details of the transmit chain functionality of the transmitter 12 are application specific. For example, when transmitting over a packet-switched network, such as the Internet, the transmit chain may include a router and a firewall coupled to an Internet Service Provider, and so on. When transmitting over a wireless network, the transmit chain may include a baseband-to-IF (Intermediate Frequency) converter, automatic gain control, filters, upconverters, a digital-to-analog converter, duplexer, antenna, and so on.

The network 32 may be implemented via a packet-switched network, circuit-switched network, wireless network, etc. Alternatively, the network 32 may be replaced with a direct communications link between the transmitter 12 and the receivers 14, 30.

The first receiver 14 receives or otherwise subscribes to the video stream transmitted by the transmitter 12 via the network 32

In the present embodiment, the first receive chain of the decoder 34 includes a reverse FEC module. The reverse FEC module implements instructions for repairing certain data loss or corruption occurring in one or more of the segments received from the transmitter 12. The certain data loss or corruption corresponds to data losses or corruption that are within a predetermined data-loss interval, called the FEC protect window. Existing FEC modules, methods, and techniques may be readily adapted for use with embodiments discussed herein by those skilled in the art without undue experimentation. The first reverse FEC module of the decoder 34 is further adapted to undue any modifications to the segments that were initially performed by the FEC module of the transmit chain before the segments were transmitted over the network 32. Such modifications can be implemented via altering of data, adding repair symbols, or a combination of both.

The decoder 34 includes a first video-decompression module (VDM) 54 that includes one or more circuits, routines, or instructions for decompressing the aggregated video stream provided by the transmitter 12. The instructions may include an inverse of the process used by video-compression and sequentializing functionality implemented by the encoder 20 and the sequentializer 18, respectively. The decoder 34 is further configured with one or more bit buffers. In one embodiment, the decoder 34 is configured with a bit buffer (BB) dedicated to each respective PLVR segment. For instance, shown in the example embodiment in FIG. 1 is a BB_SE 46 dedicated to the segments corresponding to SE PLVR. Also shown in FIG. 1 are BB_SW 48 dedicated to the segments corresponding to SW PLVR, BB_NE 50 dedicated to the segments corresponding to NE PLVR, and BB_NW 52 dedicated to the segments corresponding to NW PLVR. In some embodiments, a single bit buffer partitioned for each respective segment (e.g., SE, SW, NE, and NW) is implemented. The decoder 34 orchestrates the decoding of the buffered segments according to a defined bit buffer management policy, in some embodiments ranging in finite picture fidelity levels for the intended output pictures. The range of finite levels of picture fidelity may span from immediate, yet partial resolution decoding to full resolution decoding after a defined latency, and gradations in between, as explained further below.

Decompressed video data streams are then output by the decoder 34 and subsequently de-latticed by the first video de-latticer 42. Receiver 14 includes capabilities and/or instructions for coalescing corresponding segments, processing, and for combining the decompressed corresponding latticed pictures for output in an intended picture resolution. In some embodiments, video de-latticing functionality and decoding functionality can be features found in a single module, such as in decoder 34.

Exact details of mechanisms for reconstructing successive pictures for output from sets of p decompressed corresponding latticed pictures received in the video stream in compressed form are application specific. In some embodiments, associated auxiliary information such as tags or packet headers that identify the PLVRs (and the relationship of the received corresponding segments and non-corresponding segments) is used by receiver 14 to properly process and reconstruct the pictures of the PLVRs. This identification information, which may be added by the video latticer 16, encoder 20, and/or sequentializer 18, may enable one or more of the decoder 34 or video de-latticer 42 to manage the bit buffers 46-52, to recombine or coalesce the received segments, associate the received corresponding segments into each respective PLVR, and associate time-continuous non-corresponding segments. The two forms of association are used to effect reconstruction of output pictures at non-decreasing picture fidelity levels.

The first LCALCM1 44 includes instructions for concealing any losses in the video stream that were not repaired by the reverse FEC module of the decoder 34. Furthermore, since corresponding segments are separated by non-corresponding segments in the video streams, output picture reconstruction is controlled with successively non-decreasing or increasing fidelity levels.

The number of initial pictures, for example, after a channel is changed on a television or set-top terminal, that will have missing data depends on a number of factors, including the size or length of the segments in the video stream, the number of segments in each successive SDI of the video stream, the bit-rate of the video stream, and where the initial acquisition of the video stream (e.g., tuning) occurs with respect to the first span of segments belonging to the first received SDI (as discussed in the disclosed tuning scenarios in reference to FIG. 3A). The output of the LCALCM1 44 may be input to another stage of video processing, to a display device, to memory, or to another entity.

Various methods for concealing missing or lost information may be employed by the LCALCM1 44. For example, in one implementation, missing pixel information is estimated via an interpolation process. The interpolation process may include performing linear or nonlinear interpolation in a direction across a video picture that exhibits the least amount of change in color brightness, and/or combination thereof. Providing missing or corrupted pixel information is a type of upsampling. Accordingly, the upsampling of missing or corrupted pixels may be performed by filling in pixels in the direction of decreasing luma and/or chroma gradients using nonlinear upsampling.

Interpolation may include determining how certain information varies spatially through one or more decompressed corresponding latticed pictures, or temporally through decompressed non-corresponding latticed pictures that have consecutive output times, then continuing to interpolate pixel information to fill missing pixels in the output picture at its intended picture resolution. Various types of interpolation are possible. Details for determining values for missing pixel information can be application specific.

Furthermore, while the LCALCM1 44 generally employs pixel information associated with a given picture to estimate lost pixel information within the picture to be output in its intended picture resolution, embodiments are not limited thereto. For example, in certain implementations, pixel information from temporally adjacent pictures may be employed to further estimate lost pixel information in a given picture.

Note that embodiments discussed herein are not limited to a particular video format. Different video formats may employ different encoders and decoders. Furthermore, embodiments are not limited to video data transmission, as similar concepts discussed herein may be employed for robust transport of audio data or other types of data. Those skilled in the art with access to the present teachings may readily modify the modules of the system 10 to meet the needs of a given implementation without undue experimentation.

Having provided a general overview of an example environment in which certain embodiments are implemented, attention is directed to FIG. 3A. Certain embodiments of VL systems address, among other technical issues, start-up latency (e.g., for fast channel changes) and overall loss tolerance of the transport of the video stream containing the plural PLVRs. For instance, the loss of 100 msec of a single MPEG transport stream during transmission may result in the loss of an I picture, with the concomitant loss of an entire interval of pictures (e.g., a GOP). That is, even with a small random packet outage, an entire interval of pictures can be lost.

In one embodiment where p=4 and complete sets of congruent and independent PLVRs are provided in a video stream in successive CRLVSDIs, and in which successive sets of four CRLVSDIs contain 16 segments, start-up latency and the benefits of ordering and arrangement of the segments in the video stream (at the transmitter 12) can be explained in the context of the decoding and bit-buffering strategy illustrated in FIG. 3A, which illustrates the reception (tuning-in) and processing (e.g., decoding) of sixteen (16) segments of PLVRs, each PLVR of ¼ picture resolution. A repeating pattern for providing the segments of each of the respective PLVRs results from application of a 2×2 lattice scheme as described above. The symbols SE, SW, NE, and NW refer to the respective PLVRs 302, 304, 306, and 308 from which the respective segments (GOPs) are derived, as further indicated by the suffix to each GOP designation indicated in FIG. 3A (e.g., GOP1 (SE) referring to a GOP corresponding to the SE processed latticed video representation). As explained above, the PLVRs 302, 304, 306, and 308 correspond to respective LVRs of the input video signal. The SE PLVR 302 contains $\frac{1}{4}^{th}$ of the picture information (¼ resolution) of the intended resolution of the output picture at the decoder 34, and its processed (e.g., compressed) version is transmitted first in a sequenced, non-overlapping manner in the aggregated video stream, as described above. Accordingly, the respective GOP (e.g., GOP1 (SE), GOP2 (SE), GOP3 (SE), and GOP4 (SE)) corresponding to the SE PLVR 302 represents a time-continuous ¼ resolution GOP, with the GOPs pertaining to the other processed latticed video representations (304, 306, and 308 for SW, NE, and NW respectively) collectively representing the other ¾ resolution. It should be noted that a portion of the GOPs are shown, and that further GOPs to the left and right (e.g., indicated by dashes at each end) in FIGS. 3A (and 3B) are implied. Also included in FIG. 3A is a symbolic representation (on the right hand side of FIGS. 3A and 3B) of which GOPs from the corresponding PLVRs 302, 304, 306, and 308 are the oldest and which are the youngest. "Youngest," for purposes of the present discussion, refers to those pictures from the GOPs having the latest picture output span, or largest PTS (e.g., most advanced in time). "Oldest," for purposes of the present discussion, refers to those pictures from the GOPs having the earlier picture output span, or least or smallest PTS (e.g., most current).

In FIG. 3A, a sixteen (16), ¼ resolution GOP (e.g., segments) repeating pattern per every four successive SDIs is shown and their corresponding bit buffer activity, are shown below between symbol "<>". In one embodiment, a bit buffer is dedicated to its respective PLVR for a total of four (4) bit buffers, as in the present example. The relative time reference, which is denoted by a number, +N, within parentheses can be described as follows:

GOP1(SE) (oldest) (+0)<bit buffer (BB)_SE, remove GOP1, leave nothing>

GOP2(SW) (+1)<bit buffer (BB)_SW, remove nothing, leave GOP2>

GOP3(NE) (+2)<bit buffer (BB)_NE, remove nothing, leave GOP3>

GOP4(NW) (youngest) (+3)<bit buffer (BB)_NW, remove nothing, leave GOP4>—note that this point is where GOP4 collection begins, representing when a GOP begins (¼ resolution).

GOP2(SE) (oldest) (+0)<bit buffer (BB)_SE, remove GOP2, leave nothing>

GOP3(SW) (+1)<bit buffer (BB)_SW, remove GOP2, leave GOP3>

GOP4(NE) (+2)<bit buffer (BB)_NE, remove nothing, leave GOP3,4>

GOP5(NW) (youngest) (+3)<bit buffer (BB)_NW, remove nothing, leave GOP4,5>

GOP3(SE) (oldest) (+0)<bit buffer (BB)_SE, remove GOP3, leave nothing>

GOP4(SW) (+1)<bit buffer (BB)_SW, remove GOP3, leave GOP4>

GOP5(NE) (+2)<bit buffer (BB)_NE, remove GOP3, leave GOP4,5>

GOP6(NW) (youngest) (+3)<bit buffer (BB)_NW, remove nothing, leave GOP4, 5,6>

GOP4(SE) (oldest) (+0)<bit buffer (BB)_SE, remove GOP4, leave nothing>—note that this point is where GOP4 collection ends, representing when a GOP ends (full resolution).

GOP5(SW) (+1)<bit buffer (BB)_SW, remove GOP4, leave GOP5>

GOP6(NE) (+2)<bit buffer (BB)_NE, remove GOP4, leave GOP5,6>

GOP7(NW) (youngest) (+3)<bit buffer (BB)_NW, remove GOP4, leave GOP5, 6, 7>

A GOP is used above and below, for illustrative, non-limiting purposes, as an example segment.

Let DTS be the decode time stamp, PTS be the presentation time stamp, and PCR be the program clock reference or system clock, as specified in the MPEG-2 Transport specification (ISO/IEC 13818-1). GOPs received at the beginning of an SDI transmitted from the transmitter 12 begin with an initial buffering delay corresponding to DTS-PCR. Continuing the example, each subsequent GOP (e.g., GOP2 (SW)) is sent or transmitted at a time corresponding to DTS-(PCR-"one GOP span") (i.e., DTS minus (PCR minus a span of one GOP span)), with the next (e.g., GOP3 (NE)) transmitted at DTS-(PCR-"two GOPs span"), and the next (e.g., GOP4 (NW)) at DTS-(PCR-"three GOPs span"). The "GOP span" refers to the presentation span of a GOP. Viewed from a different perspective, and with reference to FIG. 3A, tuning into a given PLVR 302-380 within an SDI imparts a different transmission delay (and receiver-side buffering delay), where the delay is given by DTS-PCR+nSDI, where n=0, 1, 2, etc. For instance, referring to SDI 390, if one tunes into GOP2 (SW), a delay of DTS-PCR+1SDI occurs before the transmission of GOP2 (SE) 352 in SDI 391 (e.g., delayed for GOP2 (SW) in SDI 390). Tuning into the same SDI 390 at GOP3 (NE) 350 results in a delay of DTS-PCR+2SDI for the transmission of GOP3 (SE) 356 (e.g., delayed for GOP3 (SW) 353 and GOP3 (NE) 350). Similarly, tuning into the same SDI 390 at GOP4 (NW) results in a delay of DTS-PCR+3SDI for the transmission of GOP4 (SE) 360 (e.g., delay of GOP4 (SW) 357 plus GOP4 (NE) 354 plus GOP4 (NW) 351). Each I picture of each segment has a DTS and PTS that match the corresponding I compressed latticed pictures in the other three corresponding segments. Note that in this embodiment, corresponding latticed pictures are compressed with the same picture type or similar compression strategy or objective since each of the four PLVRs are independent PLVRs. Further, the buffer sizes (or occupancies) can be likened to stair steps, where GOPs of the oldest PLVR 302 are buffered first, and then GOPs from the next PLVR 304 are buffered after GOPs of the first PLVR 302, and so on. The earliest in time the segments of the PLVRs are buffered, the quicker they can enter into service.

As described previously, the segments of PLVRs are provided in a video stream in sequential non-overlapping order rather than multiplexed as a set of plural streams. For instance, consistent with FIGS. 4A-4B, the segment or GOP 352 (FIG. 4B) corresponding to the SE PLVR 302 is inserted in the stream, followed by the GOP 353 corresponding to the SW PLVR 304, followed by the GOP 354 corresponding to the NE PLVR 306, followed by the GOP 355 corresponding to the NW PLVR 308, and so on over plural consecutive, non-overlapping SDIs (e.g., 391, 392, 393, etc.) in a single video stream, as illustrated in FIG. 4B. Hence, each respective SDI includes four segments, or GOPs, ordered within the SDI from the oldest segment (corresponding to the SE PLVR 302) to the youngest segment (corresponding to the NW PLVR 308). Such an implementation will also reduce the probability of I pictures from multiple PLVRs being affected by a single correlated data loss event, thus, providing for better error concealment.

Figure 4A:
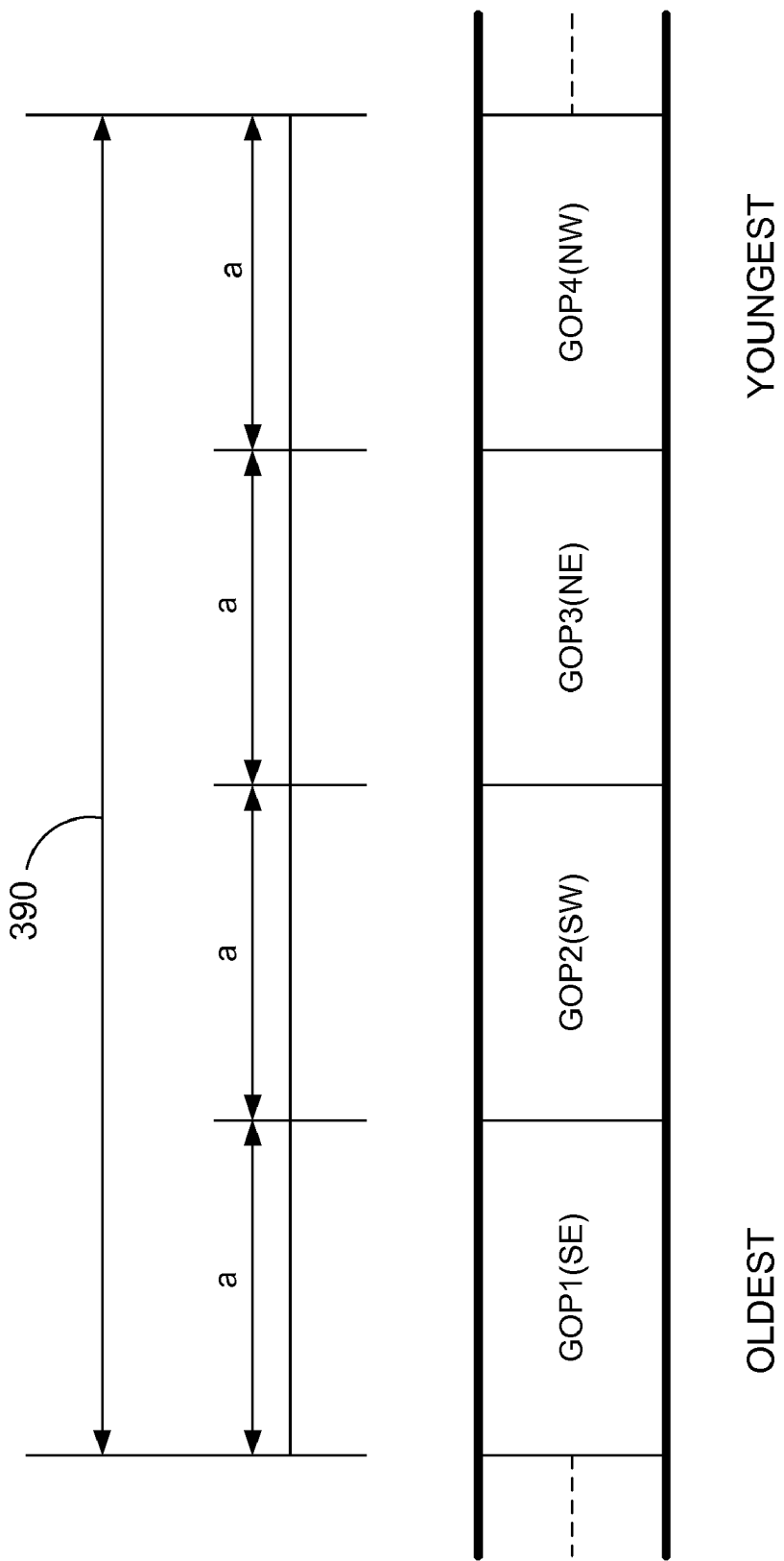
FIGS. 4A-4B are schematic diagrams that illustrate the arrangement of segment distribution intervals for ordering in a video stream the segments of processed latticed pictures from each of plural processed latticed video representations.
Figure 4B:
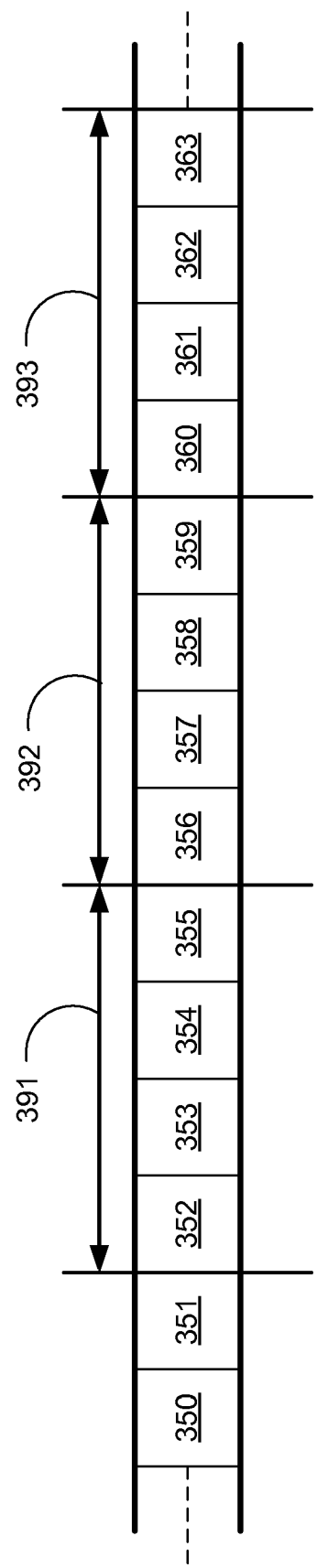

Continuing with the explanation of FIG. 4A, shown are four segments in consecutive, non-overlapping order. Each segment symbolically represents sixteen (16, though not limited to 16) processed latticed pictures comprising an example GOP. The first segment GOP1 (SE) represents the oldest GOP pertaining to the SE PLVR 302. The second segment GOP2 (SW), following after the first GOP1 (SE), represents the second youngest GOP corresponding to the SW PLVR 304. Similarly, a third segment GOP3 (NE) (corresponding to the NE PLVR 306) follows the second GOP2 (SW), and a fourth segment GOP4 (NW) (corresponding to the NW PLVR 308) follows the third GOP3 (NE), the fourth GOP4 (NW) representing the youngest GOP. In such a sequential ordering of segments, the PCR is a common clock reference to all four segments included in the SDI 390. Each of the segments (GOPs) are separated and/or respectively extracted, and each segment contains a specified number of processed pictures, the number being equal in each segment in the SDI 390 in one embodiment, with each segment hence representing the same time-continuous picture output span, "a" (e.g., the same time-contiguous span of presentation time). For instance, the entire picture output span of the four segments, which is the SDI output span for SDI 390 in FIG. 4A, in one example, is ½ second, and each SDI output time is divided for the four segments in the respective SDI, resulting in a=⅛ second time-contiguous picture output spans for each of the segments as shown in FIG. 4A. Thus, in one embodiment, each SDI includes an output picture span of ½ sec as one example output picture span. In an alternate embodiment, the output picture span of each successive SDI in the video stream is specified by the number of compressed latticed pictures in the SDI divided by the number of segments in the SDI. Note that in some embodiments, the number of bits in each of those segments is unlikely equal, but instead, the four picture output spans are equal (e.g., a=0.125 sec). That is, an encoder may opt to not appropriate the same amount of bits based on a determined coding strategy to the respective non-corresponding segments in an SDI. For instance, in some embodiments, described in further detail below, reference pictures from one or more of the younger segments may be promoted to the oldest segment, resulting in a greater number of bits in the oldest and fewer number in the youngest from which the reference pictures were promoted.

In one embodiment, each successive set of compressed corresponding latticed pictures in corresponding segments may further be compressed with the same picture type, encoding strategy, and/or same level of relative picture importance. In other words, if the GOP in the oldest segment comprises the transmission order sequence I, B, B, B, P, B, B, B, P, B, B, B, P, B, B, B, then the GOP in each of the other three corresponding segments is of the same sequence. By definition, corresponding latticed pictures have the same output time. Furthermore, in some embodiments, all segments, non-corresponding segments and corresponding segments, have the same number of compressed latticed pictures, and each successive compressed latticed picture in the segment is compressed with the same picture type, encoding strategy, and/or same level of relative picture importance. In some embodiments, there is a 1:1 correspondence in picture importance in corresponding segments. For instance, considering each segment to contain an ordered sequence of compressed pictures in transmission, the relative importance of the $1^{st}$ picture in the oldest segment is the same as the relative importance of the first picture of the second, third, and fourth segments within the SDI.

Although described using the same quantity of pictures in each of the segments in an SDI of the video stream (e.g., 16 compressed pictures, or described with 12 elsewhere), in some embodiments, the number of compressed pictures in segments may vary per SDI (e.g., the next SDI may have segments that contain 15 pictures or 20, for instance). That is, some implementations may change the picture output span of the SDI from one SDI to the next. Implementations that may warrant such changed intervals include personal video recording (PVR) applications, scene changes, splicing (e.g., due to a source change), instantiation of program boundaries, variable field frame encoding, variable repetition rate, and/or different type of programs or presentations (e.g., a high action or motion scenes, such as car chases, high action programs such as sports, and low motion programs such as newscasts).

In other embodiments, the number of processed latticed pictures in segments in "pseudo-SDIs" are different but every p segment in each pseudo-SDI is part of a complete set of corresponding segments in every set of p consecutive pseudo-SDIs. Pseudo-SDIs may not satisfy the fourth listed property of the SDI definition, as discussed above, since the total number of pictures in the SDI divided by the number of segments in the SDI may not equal an integer.

In addition, with regard to audio, typically audio is transmitted offset from video, since video typically has a much longer delay. In one embodiment, the audio is associated with the oldest segment (e.g., which is displayed first) of each successive SDI. That is, since the oldest segment is the first due for decoding and presentation, it represents the closest stream to current present time. Audio is referenced to the same common PCR. At the receive side, there is a first compressed picture slated for decoding and presentation that corresponds to DTS-PCR, and when the PTS for the first picture comes up, the audio corresponds to having this PTS being ordered in a manner such that audio due for output is there when the PTS is there.

Variations of the above are contemplated to be within the scope of the disclosed embodiments. For instance, fewer than four PLVRs may be implemented, such as three PLVRs, where only the oldest PLVR 302 (in FIG. 3A) contains I pictures and none of the other three PLVRs 304, 306, and 308 do. As another example, three PLVRs may be employed, where I pictures are sent but not on the fourth.

Full B pictures in a single video representation has the benefit that compression is more efficient, and as the least important pictures, need not be protected from errors as much as other pictures that propagate information through a given interval. Thus, in one embodiment, one or more (and in one embodiment, all) of the pictures of the input video signal that are designated as non-reference pictures in compressed form are not latticed into plural LVRs, whereas pictures of the input video signal designated as reference pictures are latticed into plural LVRs. In such embodiments, each successive SDI in the video stream has a plurality of segments, or (p+nrs) segments, where p is greater than one and equals the segments containing compressed latticed pictures, and nrs is greater than or equal to one and equals the segments containing compressed non-reference pictures in the full picture resolution of the input video signal. Compressed pictures in one or more of the segments (i.e., the p segments) in the successive non-overlapping SDIs of the video stream contain processed latticed pictures that are of smaller picture resolution than the resolution of the pictures of the input video signal, whereas the other one or more segments (i.e., the nrs segments) contain processed pictures that are non-reference pictures and have a picture resolution equal to the resolution of the pictures of the input video signal. Thus, there is a dependence by the compressed non-reference pictures in at least one of the nrs segments in an SDI on one or more compressed reference pictures, each of which is intended to have full picture resolution by the composition of the respective decompressed version of a complete set of p corresponding latticed pictures (as explained further below) in compressed form, and for which each of the p compressed latticed pictures is included in the same SDI as the respective p segments of compressed latticed pictures.

Figure 5:
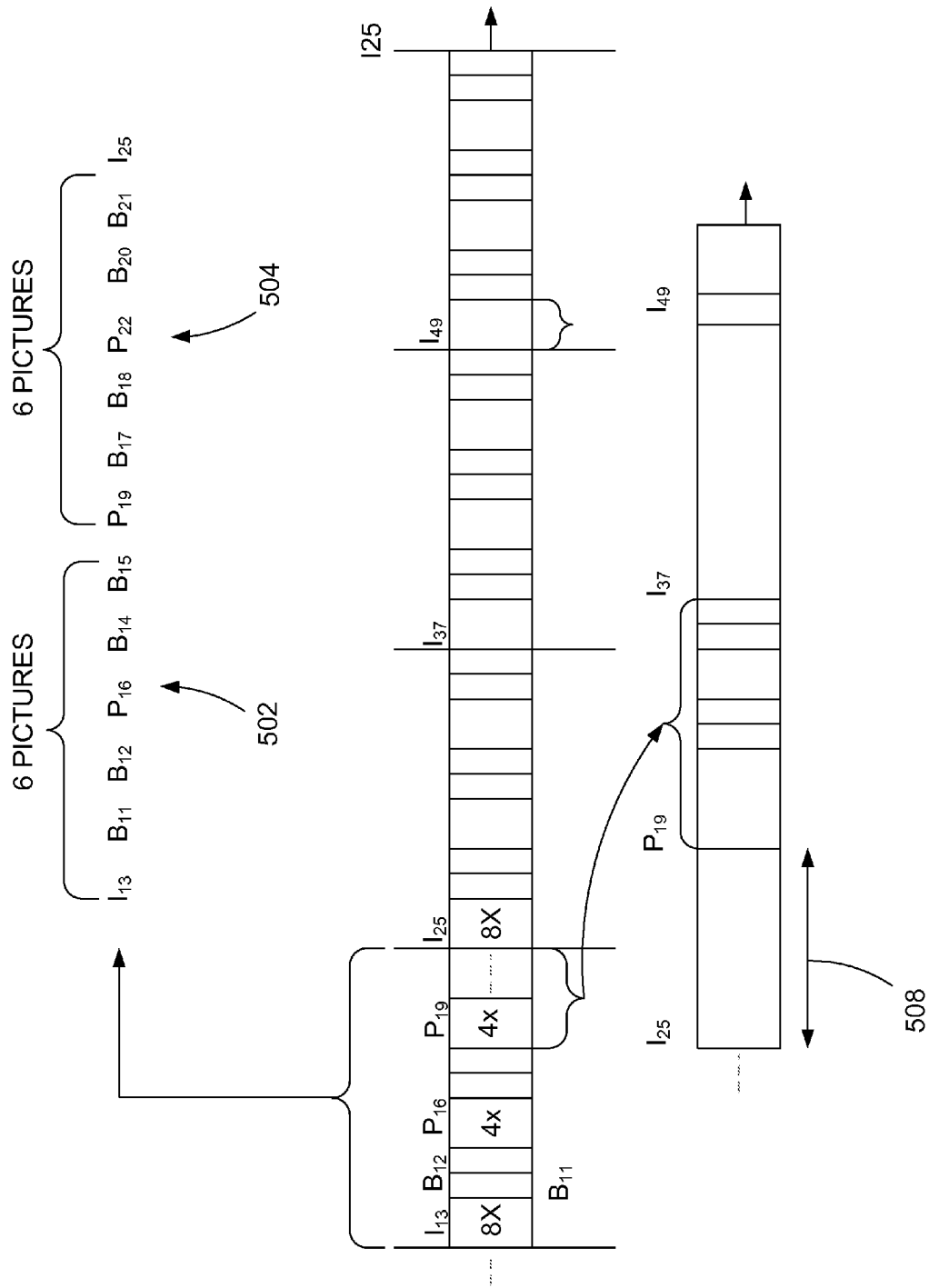
FIG. 5 is a schematic diagram that illustrates the ordering of pictures of processed latticed video representations in a video stream and the relative target data size of respective pictures in compressed form.

Attention is now directed to FIG. 5, which assists in the illustration of various schemes that can be employed to provide resolution scalability and error concealment. Shown is a GOP comprising a target appropriation in number of bits of respective pictures by the encoder 20 (in relationship among the pictures) in an 8×:4×:1× ratio (e.g., I=8×, P=4×, and B=1×), which reflects the level of importance of the three respective targets. Other appropriation of bits are contemplated to be within the scope of the embodiments. The encoder 20 is configured with a given encoding strategy, whereby the encoder 20 provides the PLVRs according to an encoding strategy that appropriates or targets a proportional number of bits (e.g., 8:4:1, or 7:3:1, etc.) to each of a plurality of pictures, each picture having a relative picture importance. For instance, the same picture type may have a different picture importance. The appropriation of bits (bit allocation), in one embodiment, is based on a factor or ratio relative to the least important picture (e.g., a B picture). The target size of each compressed picture includes the number or amount of bits in relation to the target size of the picture of the least relative importance.

For instance, the I pictures (e.g. $I_{13}$, $I_{25}$, etc.) are shown with an 8× to symbolically represent a compressed picture having more bits appropriated to it relative to the least important picture (e.g., B pictures, such as $B_{12}$). Also, the P-type pictures (e.g., $P_{16}$) are shown with a 4× within to symbolically represent that fewer bits are appropriated to such pictures than I pictures, but more bits than B pictures. Further, the GOPs are shown with 12 pictures each, with a corresponding output presentation time of the 4 segments collectively representing, in this example, 0.5 seconds of video (i.e., output picture time). The example GOP (segment) has a sequence as follows: I, B, B, P, B, B, P, B, B, P, B, B, followed by the next segment of the same ordered sequence of pictures. As explained above, each segment represents the same amount of resolution (e.g., ¼ resolution), with the combination of the four PLVRs decoded to their intended full picture resolution, and with a same DTS value corresponding to every respective I picture of four corresponding segments.

Figure 6A:
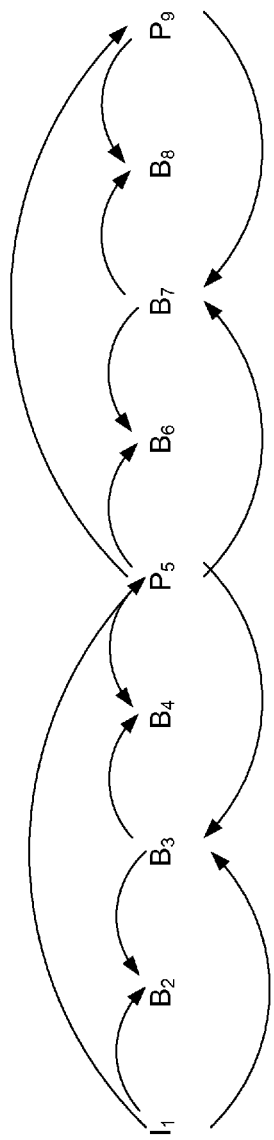
FIGS. 6A-6C are schematic diagrams that illustrate different hierarchies and picture interdependencies.
Figure 6B:
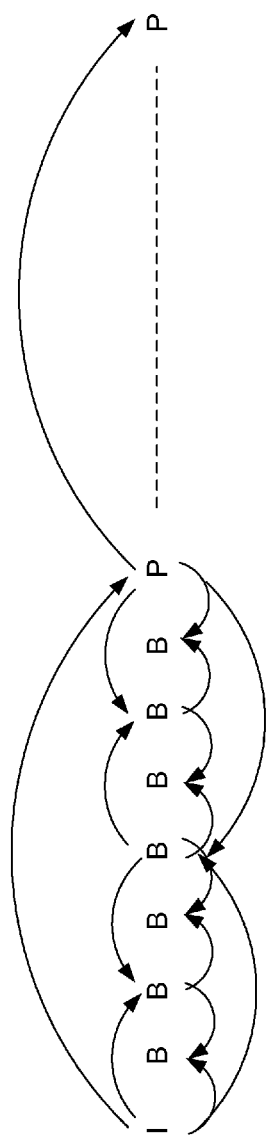
Figure 6C:
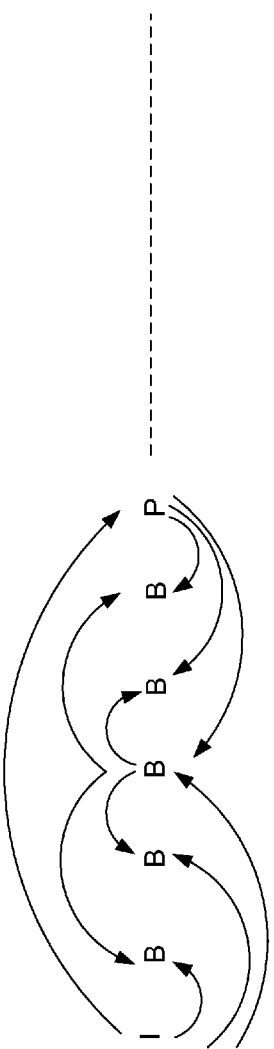

Rate control mechanisms of the encoder 20 have a target number for the bit rate, as well as encoding strategies such as the appropriate number of bits that are to be compressed, quantization value adjustments at the macroblock level or from picture to picture, etc. In MPEG-2, there are three picture types, but in AVC (ISO/IEC 14496: Part 10), there are more importance levels that are not reflected by picture (or slice) type (e.g., 4, 5, 6, etc.). So for a given picture cadence or picture repetition pattern (e.g., every 5 pictures), there can be increasingly complex interdependencies (e.g., pictures that can have up to four (4) reference pictures in HD, up to six (6) reference pictures in SD). In addition, if the picture size is reduced, there can be a greater number of reference picture (e.g., 1280×720P-60 can have up to nine (9) reference pictures with the same amount of memory as 1920×1088). Reference is made to FIG. 6A, which shows an example GOP comprising (in display order) $I_1, B_2, B_3, B_4, P_5, B_6, B_7, B_8, P_9$, etc., with the interdependencies as noted. In another example, such as that shown in FIG. 6B, the example GOP is illustrated with the following sequence (interdependencies noted): I, B, B, B, B, B, B, B, P, . . . P, where another B is added in comparison to the GOP of FIG. 6A. Accordingly, there exists different types of proportions, and hence the encoder 20 appropriates a defined number of bits. In addition, there exist different hierarchies, such as that illustrated in FIG. 6C. Reviewing the example GOPs, the more "grandparent" a picture is in the GOP (i.e., the more information from that picture propagates through the GOP), the less the quantization that is applied to that picture. In other words, the more important a picture is, the more bits it is likely to have in compressed form. In the example GOP shown in FIG. 6A, every other picture ($B_2$, $B_4$, etc.) is a non-reference (discardable) picture. In yet another variation, such as that shown in FIG. 6B, all three B pictures between the I and B picture are discardable. What is evident from these example GOPs is that, though there may be similar picture types, the proportion of bits is according to the hierarchy of propagated information—e.g., the discardable pictures are negligible, and the I pictures might have a higher number of bits. Therefore, in some embodiments, the least important pictures, which may be non-reference pictures, may be carried in a single PLVR in the full picture resolution rather than as latticed pictures. Explaining further, if one picture serves as a reference picture to other pictures, it may be considered more important than other pictures. In fact, a particular set of pictures can be viewed in a hierarchy of importance, based on picture type, total number of dependent pictures for each reference picture, number of levels of dependencies for each reference picture, and other factors. An I-picture is dependent on (i.e., references) no other pictures. An instantaneous decoding refresh picture or IDR-picture is an I-picture that forces all previously decoded pictures that are still in use as reference pictures to no longer be used as reference pictures upon decoding of the IDR picture.

Any picture that serves as a reference picture for other types of pictures is referred to in this disclosure as a non-discardable picture, where a picture that does not serve as a reference picture for any other picture is a discardable picture. A B-picture inter-predicts some of the picture's portions from at least two previously decoded reference pictures. A P-picture allows some of the picture's portions to be inter-predicted from a previously decoded reference picture. For instance, a first portion of a P-picture can depend on one previously decoded reference picture and another portion of the same P-picture can depend on a different reference picture.

A person of ordinary skill in the art should appreciate that some pictures will serve as reference pictures for many pictures. Said another way, many different pictures may depend on the same reference picture. For example, any particular I-picture typically serves as a reference pictures for many B-pictures and P-pictures.

An anchor picture can be an I-picture, IDR-picture, or a special type of FPP (forward predicted picture) that depends only on a single reference picture that is the most-recently decoded anchor picture.

The terms "depend" or "dependence" in the context of reference pictures typically means a direct dependence. An example of indirect dependence follows. Suppose picture R1 serves as a reference for picture R2, and that R2 serves as a reference for picture R3. R3 then indirectly depends on R1. A person of ordinary skill in the art should also recognize that R3 directly depends on R2, and R2 directly depends on R1.

An importance criteria involving the relative importance of pictures may use one or more, in any combination, of the following:

Picture-type: IDR, I, P or B.
Reference or non-reference picture. As described above, a non-reference picture is a discardable picture.
Type of reference picture (e.g., past, future, or bi-directionally referenced).
Number of pictures, N, directly depending on a reference picture.
Level of information propagation via indirect dependence.
Longevity it serves as a reference picture.
Longevity of information propagation.
First picture after a random access point (RAP), according to the amended MPEG-2 Systems standard for carrying an AVC stream.
Size (number of bits) of the compressed picture.
The amount of delay from the decode time of a picture to its output time.

An AVC Intra picture, or I-picture, does not reference other pictures but is typically referenced by other pictures. Unlike MPEG-2 Video, Intra compression in AVC allows for prediction of the region of the picture being compressed from the decompressed version of other portions of the same picture. An AVC "instantaneous decoding refresh" picture, or IDR-picture, is an I-picture that forces all previously decompressed pictures that are being used as reference pictures to no longer be used as reference pictures upon decompression of the IDR picture. P-pictures and B-pictures in AVC are allowed to contain intra-compressed portions. As in MPEG-2 Video, P-pictures and B-pictures in AVC allow for any, and possibly all, of a picture's portions to be inter-predicted from "previously-decompressed" reference pictures. Also similar to MPEG-2 Video, inter-prediction of any portion of a P-picture in AVC is limited to using at most one reference picture at a time. However, in contrast to MPEG-2 Video, each different inter-predicted portion of an AVC P-picture is allowed to be predicted from any one of several distinct reference pictures. Similar to MPEG-2 Video, inter-prediction of any portion of a B-picture in AVC is limited to using at most two reference pictures. But whereas MPEG-2 Video uses at most two reference pictures for all of the B-picture, any of several distinct reference pictures is allowed to be used on each different inter-predicted portion of an AVC B-picture.

Thus, the AVC standard specifies a P-picture by allowing each different inter-predicted portion of the picture to be predicted from "at most one" of any of a plurality of different reference pictures, as for example, 16 reference pictures. Unlike the MPEG-2 video standard or other video compression specifications that further limit inter-prediction to referencing one "predetermined" past reference picture, in AVC there is no such limitation. For instance, a first portion of an AVC P-picture can depend on one reference picture and another portion on a different reference picture. In fact, a picture referenced by a first portion of an AVC P-picture may be a past reference picture, and a second portion may depend on a future reference picture. As another example of the elaborate and complex picture-interdependencies allowed in AVC, a first AVC P-picture may depend on four future reference pictures, a second AVC P-picture may depend on three past reference pictures, and a third AVC P-picture may depend on both, a plurality of past reference pictures and a plurality of future reference pictures.

The AVC standard also specifies the B-picture differently than does the MPEG-2 video standard. MPEG-2 video specifies a B picture as a bi-directional picture, allowing for any portion of the picture to be compressed with a dependence of not more than two reference pictures, one a "predetermined" future reference picture, and the other a "predetermined" past reference picture. The same two reference pictures, or either of them, must be used as the reference pictures for predicting any portion of the B-picture. On the other hand, an AVC B-picture can depend on a plurality of reference pictures, for instance, up to 16 reference pictures, as long as any region of the B-picture is predicted by at most two regions in the plurality of reference pictures. When a region of the B-picture is predicted by two regions, it is said to be bi-predicted rather than bi-directionally predicted. In further contrast to MPEG-2 Video, an AVC B-picture is allowed to be used as a reference picture by other P-pictures or B-pictures.

Having digressed briefly in describing picture types and picture importance, attention is once again directed to FIG. 5 in the context of several error resiliency scenarios. In one scenario, if there is an error within the first segment corresponding to a particular processed latticed video representation, and such an error occurs in the middle of the segment, $I_{13}$ can be displayed all the way through where the error occurred, and the last picture can be repeated until $I_{25}$ is reached, where processing can proceed as normal.

In another scenario, if an impairment is incurred in $I_{13}$, and there is a desire to provide full resolution (all four segments), then there is a delay until the next SDI begins (corresponding to the oldest interval). In this example shown in FIG. 5, the delay is benign (about ½ second delay of output picture time assuming an output picture time of ½ sec for four segments). However, if the delay was significantly larger (e.g., five (5) seconds of output picture time), then the error is more evident. In one embodiment, a solution can be to prematurely process and output a picture repeatedly until the time base is reached (which is the actual DTS and now current), allowing the commencement of playback at a certain picture fidelity level, such as output pictures with genuine partial picture resolution.

Another approach to reducing delay (e.g., at a channel change operation) is to modify the interval or GOP corresponding to the oldest PLVR (or the first segment in each SDI). In one embodiment, the interval of the oldest segment, or oldest GOP, which corresponds to PLVR SE 302 in FIG. 3A, is divided in half as shown in FIG. 5 (e.g., a first half 502 and a second half 504, each of 6 pictures of the 12 picture GOP in the other PLVRs, and each of the halves having output picture spans of a defined amount), and if the second half 504 can be provided before it is due (before its DTS), the second half 504 is inserted after the second segment 508 or elsewhere (in the middle of the second segment).

One approach to improving error resiliency is to increase the frequency of I pictures in a given segment to occur more than once within the oldest segment, so if the first I picture is lost, processing can commence starting at the next I picture in that segment. Note that a relational or proportion of bits for each type of encoded picture is assumed and represented in FIG. 5 (e.g., I pictures are appropriated a larger number of bits (twice the amount) than P pictures, and P pictures are four times as "fat" as B pictures). Hence, there is a proportion in bit allocations among pictures. To minimize the channel change time (or if it is writing and not being burst), or to minimize the effect of an error, one method (illustrated in FIG. 5) is to promote the P picture ($P_{19}$) in the second half 504 to an I picture. By doing so, the bit appropriation for the given picture goes from 4× (relative to a B picture) to 8× (relative to a B picture). In conjunction with the promotion, 4× needs to be recovered. One mechanism to recover 4× is to perform a reciprocal of the I pictures (e.g., demote an 8× from one of the other segments corresponding to the other three processed latticed video representations to 4×). For instance, $I_{49}$ can be demoted to a P type picture. In some embodiments, the promotion may not be offset (at the expense of bit-rate or in some embodiments, while maintaining the bit-rate).

Demotion is not limited to a particular PLVR though promotion is generally implemented in the oldest (e.g., SE) segment and demotion is implemented in one or more of the other segments (e.g., NE, NW, SW) corresponding to the other PLVRs or according to transmission channel characteristics. In one embodiment, demotion can be implemented as a rotation among the other three (non-oldest) segments, or in some embodiments, rotation may occur among all four segments. Further, though described in the context of segments corresponding to four PLVRs, variations in the number of PLVRs and/or GOP or interval lengths are contemplated as well. In general, there is a promotion of K pictures having a second highest importance level, such as P-type of picture in MPEG-2 video, in the oldest PLVRs to I pictures, where p is the number of PLVRs (e.g., four in this example), and where K=p−2. In addition, there is also a relationship of how the oldest segment is divided up to provide the p−2. For instance, one approach is to divide up in equal segments, which works well if there are four (4) P-type pictures (since one approach can be to promote the second and third P pictures). However, in the case of three P pictures, perhaps selecting two is appropriate based on a given relationship. Note that the presence of multiple PLVRs enables the promotion and demotion to be implemented in one or more embodiments. In some embodiments, different arrangements are contemplated. For instance, FIG. 5 shows dividing the oldest segment into one-half as one example. However, in some embodiments, the segment may be divided into other portions, such as in one-thirds. Further, FIG. 5 reflects maintaining the transmission order per quadrant as one example implementation. However, in some embodiments, variations in the transmission order are contemplated, with the oldest PLVR divided into even segments. For instance, in view of the above-described variations, one example approach may be a transmission order according to order of importance (e.g., "youngest"→"oldest/3"→"second youngest"→"oldest/3"→"second oldest"→"oldest/3"). In other words, variations of the division and/or reordering (e.g., of the transmission order) are contemplated for certain embodiments, where certain benefits that may result include the retention or improvement of fast-start benefits and/or error resiliency.

Note that some of the embodiments described herein maintain a 1:1 correspondence of picture importance among the plural PLVRs, and others embodiments do not. For instance, in some promotion/demotion embodiments, there may be a lower frequency of providing the I pictures (even if still maintaining time correlations, same number of pictures), such as in the segments corresponding to the younger processed latticed video representations, to reduce the bit rate or gain it back. Such embodiments maintain the inter-relationship of time and number of pictures, in addition to managing the bit rate. Hence, depending on the extent of the initial buffering delay, promotions and/or demotions can be distributed among the segments as long as DTS/PTS relationships are not violated.

In some embodiments, the promotion and demotion operations result in combinations of pictures from among corresponding segments of the PLVRs that are encoded differently or with different picture types. For instance, a processed I latticed picture of one quarter may be combined with a processed P latticed picture from another PLVR, resulting in a combining of different levels or picture types. As another example, a B or P picture from one segment of a PLVR may be allowed to reference an anchor picture of a segment from another PLVR, such as when the PLVR is not an independent PLVR.

Figure 7:
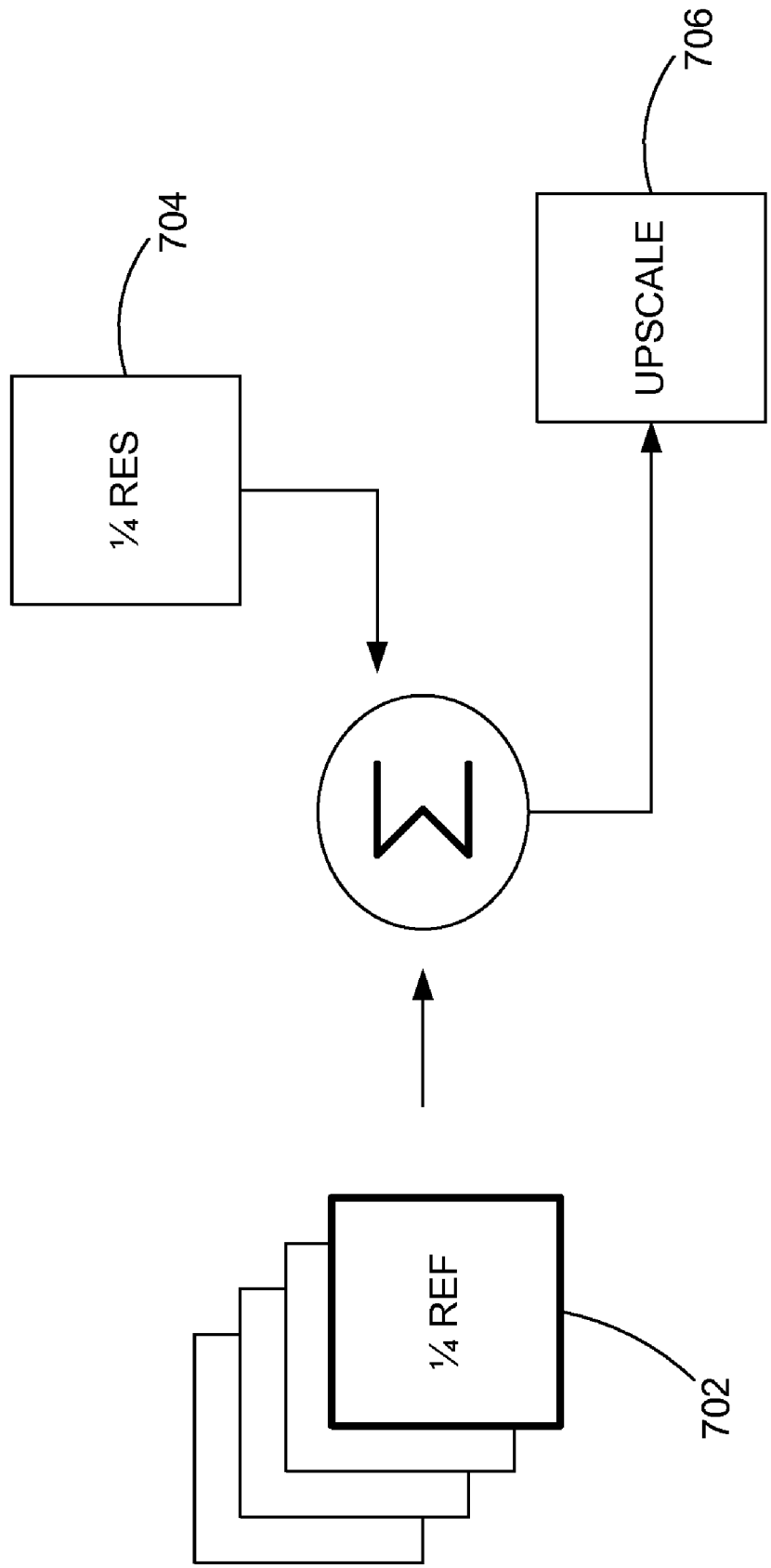
FIG. 7 is a block diagram that illustrates a resolution strategy in motion compensation.

FIG. 7 is a block diagram that conceptually illustrates how residuals in the decoding loop of the encoder 20 (and also the decoder 34 at the receiver 14) are processed in the context of the PLVRs. In one implementation (not illustrated in FIG. 7), and using the four PLVRs example though not limited to four PLVRs, assume a ¼ resolution reference latticed picture (e.g., I) or anchor latticed picture. While decoding a full resolution P or B picture that relies on a ¼ resolution I latticed picture (or other anchor or reference latticed picture) that is upscaled for reconstruction, the addition of the residual (i.e., full resolution residual plus ¼ resolution anchor latticed picture) may represent one approach. In an improved implementation, illustrated in FIG. 7, the ¼ size reference latticed picture 702 is not upscaled until after a quartered residual 704 is added. That is, the full residual is quartered (¼ resolution residual 704), summed with the reference picture 702, and upscaled 706 afterwards. The latter implementation can work whether the reference picture is ¼ resolution, ½ resolution, or ¾ resolution, as long as the residual is scaled accordingly. In some embodiments, residual pictures for at least one of the PLVRs are not latticed (or fractional picture resolution). For instance, if there is a loss that affects at least a portion of a reference picture, the subsequent residuals relative to that affected reference picture are full resolution, enabling reconstruction from the intended visual data. However, the reference pictures comprise a fractional resolution, so rather than upscale that fractional resolution reference picture, and then try to match the sum of the residual, the residual is downscaled, a summation is performed, and then the result can be upscaled. The result in terms of resolution is approximately the same in both approaches, but visually, there is expected to be error anyway in adding a full resolution residual to a partial resolution anchor but at more computational cost. Accordingly, in one embodiment, one method embodiment comprises starting with the reference data at its given resolution, adjusting the residual data accordingly, and then scaling the summation up.

At the receiver 14, 30, in one embodiment, different bit buffer management policies are implemented based on the buffer structure (e.g., separate bit buffers per respective segments of processed latticed video representations, as explained above, or in some embodiments, a single bit buffer for the segments corresponding to the collective PLVRs). Bit buffer management policies include reliance on the DTS, constant bit rate considerations, underflow, etc. For instance, in an embodiment utilizing a bit buffer per respective processed latticed video representation, one bit buffer management policy is to allow the bit buffer to reach zero (fast drain) to enable fast channel change implementations. That is, the ¼ size pictures enable a quartering of the initial buffering delay if the bit buffer is allowed to reach zero, although not the only way. In some embodiments, the transmitter 12 (e.g., the encoder 20) may provide auxiliary information on buffering rules, such as allowed buffer sizes, etc.

In some embodiments, the receiver is configured to provide a graphics user interface (GUI) that provides a subscriber the option to configure the manner in which fast channel change and this balance between fidelity and delay is employed. For instance, FIG. 8 is a screen diagram of a channel change configuration settings GUI 80 (herein, simply GUI 80) that may be invoked via a user settings menu or other configuration screen. As shown, the GUI 80 includes several options that can be selected on the screen (e.g., through the use of a moving icon as in the computer arts, touch screen, or representative selections displayed by a symbolic icon on the screen, such as "A", "B", "C" or other alphanumerics), that implies or suggests to the subscriber that selection of the corresponding button on a remote device or directly on the terminal (television, set-top, hand-held communications device, etc.), enabling the user to activate the given option. For instance, displayed options include enabling the subscriber to wait less and rapidly ramp up 82 at lower fidelity, or wait longer, and start in full high fidelity 84. More options button icon 86 may be selected by the subscriber, resulting in the invocation and subsequent display of a second menu 90 as shown in FIG. 9. Such options may be implemented in conjunction with one of the selections in the channel change GUI 80, and include an option to display a frozen image 92, a low resolution full motion image 94, a full motion, full resolution image 96, and a low resolution, slow motion image that slowly ramps up to the display rate 98.

Note that the four PLVRs, in one embodiment, are independently decodable. In embodiments where B pictures are relegated to a single PLVR, then independent decoding among all PLVRs is not available.

When the segments corresponding to the PLVRs are received and buffered at the receiving device (e.g., receiver 14), one of a plurality of decoding strategies may be implemented. For instance, upon tuning to a given channel that contains these segments, the segments corresponding to the SE PLVRs reside in the bit buffer before the segments corresponding to the other three latticed video representations, and hence should one strategy be to begin decoding immediately, the resulting displayed sequence of reconstructed pictures have ¼ resolution (since only the segments corresponding to the SE PLVRs has been buffered). Successive intervals of delay before decoding results in increased resolution (e.g., ½ resolution if pictures from SE and SW segments are used, ¾ resolution if pictures corresponding to the SE, SW, and NE segments are used, and full resolution if decoding is delayed until all corresponding segments have been buffered). The extent to whether the gradations in resolution are discernable by a viewer depends on the interval of delay. For instance, the longer the interval, the more tolerant to loss due to errors, but the greater the start-up latency to full-resolution. Some example strategies for implementing decoding of the segments pertaining to the PLVRs includes the stages implied above, namely, a frozen image of ¼ resolution, full motion resolution, and full motion, full resolution, with gradations in between.

In some embodiments, the plural processed representations of a single video signal are delivered as a single video stream. One having ordinary skill in the art should understand in the context of the present disclosure that in some embodiments, the plural processed representations are delivered as plural multiplexed streams of an MPEG-2 program. For example, in the context of video streams, the NE stream may be delivered as one video stream, the NW stream as another video stream, and so on. As another example, the plural processed representations of a video program may be delivered according to plural different stream types (with different PIDs), or in some embodiments, as indicated above, as a single stream type (with a single PID).

While certain embodiments discussed herein are discussed primarily with respect to the processing and transport of video data, embodiments are not limited thereto. For example, other types of data, such as audio data, text, or other types of data may be latticed, ordered and/or time shifted, and transmitted in accordance with the present teachings without departing from the scope thereof.

While various embodiments disclosed herein have has been discussed with respect to creation of four latticed video representations from an input video signal, embodiments are not limited thereto.

Although a process of the present disclosure may be presented as a single entity, such as software, instructions, or routines executing on a single machine, such software, instructions, or routines can readily be executed on multiple machines. That is, there may be multiple instances of a given software program, a single program may be executing on two or more processors in a distributed processing environment, parts of a single program may be executing on different physical machines, etc. Furthermore, two different programs can be executing in a single machine, or in different machines.

Although the VL systems and methods have been discussed with respect to specific embodiments thereof, these embodiments are merely illustrative, and not restrictive, of the VL systems and methods. Embodiments of the present disclosure can operate between any two processes or entities including users, devices, functional systems, or combinations of hardware and software. For example, while latticing has been described herein as operating primarily upon video pictures, other portions, arrangements or groupings of video can be subjected to latticing. For example, groups of pictures (GOPs), pictures, frames, or other layers or portions of video content may be subjected to latticing.

Any suitable programming language can be used to implement the routines or other instructions employed by various network entities. Example programming languages include C, C++, Java, assembly language, etc. Different programming techniques can be employed such as procedural or object oriented. The routines can execute on a single processing device or multiple processors. The routines can operate in an operating system environment or as stand-alone routines occupying all, or a substantial part, of the system processing.

In the description herein, numerous specific details are provided, such as examples of components and/or methods, to provide a thorough understanding of embodiments of the present disclosure. One skilled in the relevant art will recognize, however, that an embodiment of the disclosure can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present disclosure.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. A computer may be any processor in communication with a memory.

Reference throughout this specification to "one embodiment", "an embodiment", "a specific embodiment", of "an implementation" means that a particular feature, structure, or characteristic described in connection with the embodiment is included in at least one embodiment of the present disclosure and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present disclosure may be combined in any suitable manner with one or more other embodiments. It is to be understood that other variations and modifications of the embodiments of the present disclosure described and illustrated herein are possible in light of the teachings herein and are to be considered as part of the spirit and scope of the present disclosure.

Embodiments of the disclosure may be implemented in whole or in part by using a programmed general purpose digital computer; by using application specific integrated circuits, programmable logic devices, field programmable gate arrays, optical, chemical, biological, quantum or nanoengineered systems or mechanisms; and so on. In general, the functions of the present disclosure can be achieved by any means as is known in the art. Distributed or networked systems, components, and/or circuits can be used. Communication, or transfer of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present disclosure to implement a program or code that can be stored in a computer-readable storage medium or device to permit a computing system to perform any of the methods described above.

Additionally, any signal arrows in the drawings/figures should be considered only as examples, and not limiting, unless otherwise specifically noted. For example, an arrow on a signal path indicating communication in one direction does not necessitate that communication along that signal path is limited to that one direction.

Furthermore, the term "or" as used herein is generally intended to mean "and/or" unless otherwise indicated. In addition, the term "includes" is taken to mean "includes but is not limited to." Combinations of components or steps will also be considered as being noted, where terminology is foreseen as rendering the ability to separate or combine is unclear.

As used in the description herein and throughout the claims that follow "a", "an", and "the" include plural references unless the context clearly dictates otherwise. Furthermore, as used in the description herein and throughout the claims that follow, the meaning of "in" includes "in" and "on" unless the context clearly dictates otherwise.

The foregoing description of illustrated embodiments of the present disclosure, including what is described in the Abstract, is not intended to be exhaustive or to limit the disclosure to the precise forms disclosed herein. While specific embodiments of, and examples for, the disclosure are described herein for illustrative purposes only, various equivalent modifications are possible within the spirit and scope of the present disclosure, as those skilled in the relevant art will recognize and appreciate. As indicated, these modifications may be made to the present disclosure in light of the foregoing description of illustrated embodiments of the present invention and are to be included within the spirit and scope of the present disclosure.

Thus, while the present disclosure has been described herein with reference to particular embodiments thereof, a latitude of modification, various changes and substitutions are intended in the foregoing disclosures, and it will be appreciated that in some instances some features of embodiments of the disclosure will be employed without a corresponding use of other features without departing from the scope and spirit of the disclosure as set forth. Therefore, many modifications may be made to adapt a particular situation or material to the essential scope and spirit of the present disclosure. It is intended that the disclosure not be limited to the particular terms used in following claims and/or to the particular embodiment disclosed as the best mode contemplated for carrying out this disclosure, but that the invention will include any and all embodiments and equivalents falling within the scope of the appended claims.

At least the following is claimed:

1. A computer-implemented method, comprising:
receiving plural representations of a single video signal, wherein each of the plural representations includes a respective sequence of latticed pictures, wherein each latticed picture in each of the plural representations originates from a corresponding respective picture of the video signal, wherein the order of successive pictures in each of the plural representations of the video signal corresponds to the order of successive pictures in the video signal;
processing the plural representations;
separating the processed plural representations into plural segments, each segment consisting of a respective sequence of processed latticed pictures from one of the processed plural representations;
arranging the plural segments in successive segments distributions intervals (SDIs) according to a first temporal order and a second temporal order, the successive SDIs to be provided in a video stream;
promoting one or more of the processed latticed pictures among one or more of the plural segments, the promotion corresponding to an increase in picture importance;
processing the arranged plural segments, wherein a first complete set of representations of a first segment of the video signal is provided over a number of successive SDIs equal to number of representations in the first complete set, wherein the oldest segment corresponds to processed latticed pictures having the earliest picture output span; and
providing the processed arranged plural segments in a video stream, wherein receipt of the first segment triggers: decompressing the processed latticed pictures of the first segment; forming pictures by de-latticing the decompressed pictures of the first segment; and providing the de-latticed pictures of the first segment for display at a partial picture resolution of the corresponding pictures of the video signal, the partial resolution corresponding to a picture resolution of 1/p, where p equals the number of arranged plural segments.

2. The method of claim 1, wherein one of the plural segments in each of the SDIs comprises an oldest segment, the oldest segment comprising a second portion of processed latticed pictures following a first portion of the oldest segment, wherein the promoting comprises promoting at least one processed latticed picture in the second portion from a first relative picture importance to a second relative picture importance.

3. The method of claim 2, wherein the promoting of the at least one processed latticed picture comprises increasing bit appropriations for the at least one processed latticed picture a defined amount of bits relative to a determined appropriation of bits for latticed pictures possessing a least picture importance.

4. The method of claim 3, further comprising demoting at least one of the processed latticed pictures of at least one of the segments of the plural segments, the demoting corresponding to a decrease in relative picture importance for the demoted latticed picture.

5. The method of claim 4, wherein demoting comprises decreasing bit appropriations for the at least one of the processed latticed pictures by the defined amount.

6. The method of claim 4, wherein selection of the at least one of the processed latticed pictures for demotion is based on transmission channel characteristics.

7. The method of claim 4, wherein selection of the at least one of the processed latticed pictures is based on a rotation among all non-oldest segments.

8. The method of claim 4, wherein selection of the one of the processed latticed pictures is based on a rotation among the oldest segments and the non-oldest segments.

9. The method of claim 1, wherein the first temporal order specifies a temporal relationship between the one or more segments included in each of the successive SDIs, and wherein the second temporal order specifies the order of each set of p corresponding segments over each set of p successive SDIs to be provided in the video stream, wherein corresponding segments comprise processed latticed pictures originating from the same picture of the video signal, and where p is an integer number greater than one.

10. A computer-implemented method, comprising:
receiving plural representations of a single video signal, wherein each of the plural representations includes a respective sequence of latticed pictures, wherein each latticed picture in each of the plural representations originates from a corresponding respective picture of the video signal, wherein the order of successive pictures in each of the plural representations of the video signal corresponds to the order of successive pictures in the video signal;
processing the plural representations;
separating the processed plural representations into plural segments, each segment consisting of a respective sequence of processed latticed pictures from one of the processed plural representations;
arranging the plural segments in successive segments distributions intervals (SDIs) according to a first temporal order and a second temporal order;
processing the arranged plural segments, wherein a first complete set of representations of a first segment of the video signal is provided over a number of successive SDIs equal to number of representations in the first complete set, wherein the oldest segment corresponds to processed latticed pictures having the earliest picture output span; and
providing the processed arranged plural segments in a video stream, wherein receipt of the first segment triggers: decompressing the processed latticed pictures of the first segment; forming pictures by de-latticing the decompressed pictures of the first segment; and providing the de-latticed pictures of the first segment for display at a partial picture resolution of the corresponding pictures of the video signal, the partial resolution corresponding to a picture resolution of 1/p, where p equals the number of arranged plural segments.

11. The method of claim 10, wherein modifying comprises logically dividing the oldest segment of a first SDI into a second portion followed by a first portion and providing the second portion in a next oldest segment of the first SDI.

12. The method of claim 10, wherein modifying comprises logically dividing the oldest segment of a first SDI into a second portion followed by a first portion and providing the second portion after the completion of the next oldest segment of the first SDI.

13. The method of claim 10, wherein the modifying is responsive to receipt of a channel change request.

14. The method of claim 10, wherein the first temporal order specifies a temporal relationship between the one or more segments included in each of the successive SDIs, and wherein the second temporal order specifies the order of each set of p corresponding segments over each set of p successive SDIs to be provided in a video stream, wherein corresponding segments comprise processed latticed pictures originating from the same picture of the video signal, and where p is an integer number greater than one.

15. A system, comprising:
a memory having executable instructions; and
one or more processors configured to execute the instructions, the instructions causing the one or more processors to:
receive plural representations of a single video signal, wherein each of the plural representations includes a respective sequence of latticed pictures, wherein each latticed picture in each of the plural representations originates from a corresponding respective picture of the video signal, wherein the order of successive pictures in each of the plural representations of the video signal corresponds to the order of successive pictures in the video signal;
process the plural representations;
separate the processed plural representations into plural segments, each segment consisting of a respective sequence of processed latticed pictures from one of the processed plural representations;
arrange the plural segments in successive segments distributions intervals (SDIs) according to a first temporal order and a second temporal order, the successive SDIs to be provided in a video stream;
promote one or more of the processed latticed pictures among one or more of the plural segments, the promotion corresponding to an increase in the picture importance;
process the arranged plural segments, wherein a first complete set of representations of a first segment of the video signal is provided over a number of successive SDIs equal to number of representations in the first complete set, wherein the oldest segment corresponds to processed latticed pictures having the earliest picture output span; and
provide the processed arranged plural segments in a video stream, wherein receipt of the first segment triggers: decompressing the processed latticed pictures of the first segment; forming pictures by de-latticing the decompressed pictures of the first segment; and providing the de-latticed pictures of the first segment for display at a partial picture resolution of the corresponding pictures of the video signal, the partial resolution corresponding to a picture resolution of 1/p, where p equals the number of arranged plural segments.

16. The system of claim 15, wherein one of the plural segments in each of the SDIs comprises an oldest segment, the oldest segment comprising a second portion of processed latticed pictures following a first portion of the oldest segment, wherein the one or more processors are further configured by the instructions to promote at least one processed latticed picture in the second portion from a first relative picture importance to a second relative picture importance.

17. The system of claim 16, wherein the one or more processors are further configured by the instructions to promote by increasing bit appropriations for the at least one processed latticed picture a defined amount of bits relative to a determined appropriation of bits for latticed pictures possessing a least picture importance.

18. The system of claim 17, wherein the one or more processors are further configured by the instructions to demote at least one of the processed latticed pictures of at least one of the segments of the plural segments, the demoting corresponding to a decrease in relative picture importance for the demoted latticed picture, wherein demoting comprises decreasing bit appropriations for the at least one of the processed latticed pictures by the defined amount.

19. The system of claim 15, wherein the one or more processors are further configured by the instructions to modify a length of an oldest segment of one or more of the SDIs, wherein modifying comprises logically dividing the oldest segment of a first SDI into a second portion followed by a first portion and providing the second portion in a next oldest segment of the first SDI.

20. The system of claim 15, wherein the one or more processors are further configured by the instructions to modify a length of an oldest segment of one or more of the SDIs, wherein modifying comprises logically dividing the oldest segment of a first SDI into a second portion followed by a first portion and providing the second portion after the completion of the next oldest segment of the first SDI.

* * * * *